(12) United States Patent
Shu et al.

(10) Patent No.: US 9,451,387 B2
(45) Date of Patent: Sep. 20, 2016

(54) METHOD, M2M TERMINAL, AP, AND SYSTEM FOR ACHIEVING MACHINE TO MACHINE SERVICE

(71) Applicant: Huawei Device Co., Ltd., Shenzhen (CN)

(72) Inventors: Guiming Shu, Shenzhen (CN); Zhiming Ding, Shenzhen (CN); Zhiyong Zhang, Shenzhen (CN); Ping Fang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 262 days.

(21) Appl. No.: 14/145,164

(22) Filed: Dec. 31, 2013

(65) Prior Publication Data

US 2014/0112301 A1    Apr. 24, 2014

Related U.S. Application Data

(63) Continuation of application No. PCT/CN2012/078656, filed on Jul. 14, 2012.

(30) Foreign Application Priority Data

Jul. 14, 2011    (CN) .......................... 2011 1 0196951

(51) Int. Cl.
*H04W 4/00* (2009.01)
*H04W 12/06* (2009.01)
(Continued)

(52) U.S. Cl.
CPC ............. *H04W 4/005* (2013.01); *H04W 8/245* (2013.01); *H04W 76/02* (2013.01); *H04L 63/162* (2013.01); *H04W 12/06* (2013.01); *H04W 48/20* (2013.01); *H04W 84/12* (2013.01); *Y02B 60/50* (2013.01)

(58) Field of Classification Search
CPC .... H04W 4/005; H04W 76/02; H04W 12/06
See application file for complete search history.

(56) References Cited

U.S. PATENT DOCUMENTS

| | | | |
|---|---|---|---|
| 7,885,639 B1* | 2/2011 | Satish | H04L 9/32 455/410 |
| 8,638,748 B2* | 1/2014 | Kojima | H04W 76/021 370/235 |

(Continued)

FOREIGN PATENT DOCUMENTS

| | | |
|---|---|---|
| CN | 1585366 A | 2/2005 |
| CN | 101895832 A | 11/2010 |

(Continued)

OTHER PUBLICATIONS

Partial English Translation and Abstract of Chinese Patent Application No. CN101959192A, Oct. 10, 2014, 14 pages.

(Continued)

*Primary Examiner* — Rasheed Gidado
(74) *Attorney, Agent, or Firm* — Conley Rose, P.C.; Grant Rodolph; Nicholas K. Beaulieu

(57) ABSTRACT

A method, a machine to machine (M2M) terminal, an access point (AP), and a system for achieving a machine to machine service are provided. The method includes: determining an AP that supports the M2M service; establishing a communication connection to the AP; receiving service configuration information sent by the AP; and sending a service data report message to the AP according to the service configuration information, where the service data report message includes service data corresponding to the M2M service. The M2M terminal includes a determining module, a connection module, a first receiving module, and a first sending module. The AP includes a first determining module, a connection module, a first sending module, and a first receiving module. The system includes the M2M terminal, the AP, and the M2M server according to embodiments of the present invention.

13 Claims, 19 Drawing Sheets

(51) Int. Cl.
*H04W 76/02* (2009.01)
*H04W 8/24* (2009.01)
*H04W 48/20* (2009.01)
*H04L 29/06* (2006.01)
*H04W 84/12* (2009.01)

(56) References Cited

U.S. PATENT DOCUMENTS

| | | | |
|---|---|---|---|
| 2004/0266427 A1 | 12/2004 | Kurokawa | |
| 2009/0150976 A1* | 6/2009 | Qian | H04W 12/08 726/3 |
| 2010/0014505 A1* | 1/2010 | Wang | H04L 5/22 370/347 |
| 2010/0165928 A1* | 7/2010 | Chen | H04W 8/065 370/329 |
| 2010/0278162 A1* | 11/2010 | Groux | H04W 8/18 370/338 |
| 2011/0040969 A1* | 2/2011 | Yao | H04W 12/06 713/168 |
| 2012/0066396 A1* | 3/2012 | Kang | H04L 12/1868 709/226 |
| 2012/0106431 A1 | 5/2012 | Wu et al. | |
| 2012/0131116 A1* | 5/2012 | Tu | H04L 63/101 709/206 |
| 2012/0178489 A1* | 7/2012 | Kang | H04W 4/005 455/517 |
| 2012/0195216 A1* | 8/2012 | Wu | H04W 72/0486 370/252 |
| 2012/0287854 A1 | 11/2012 | Xie et al. | |
| 2012/0322457 A1* | 12/2012 | Lee | H04W 4/14 455/452.1 |
| 2013/0029716 A1* | 1/2013 | Lee | H04W 4/005 455/519 |
| 2013/0040630 A1 | 2/2013 | Lin | |
| 2013/0188515 A1* | 7/2013 | Pinheiro | H04W 4/001 370/254 |
| 2013/0260801 A1* | 10/2013 | Kim | H04W 4/005 455/458 |

FOREIGN PATENT DOCUMENTS

| | | |
|---|---|---|
| CN | 101959133 A | 1/2011 |
| CN | 101959192 A | 1/2011 |
| CN | 102045810 A | 5/2011 |
| CN | 1020123477 A | 7/2011 |
| WO | 2006122315 A2 | 11/2006 |
| WO | 2010077532 A1 | 7/2010 |
| WO | 2011022171 A2 | 2/2011 |

OTHER PUBLICATIONS

Foreign Communication From A Counterpart Application, Chinese Application No. 201110196951.7, Chinese Office Action dated Aug. 27, 2014, 6 pages.
Foreign Communication From A Counterpart Application, Chinese Application No. 201110196951.7, Chinese Search Report dated Aug. 19, 2014, 2 pages.
Foreign Communication From A Counterpart Application, Chinese Application No. 201310037784.0, Chinese Office Action dated Nov. 3, 2014, 5 pages.
Foreign Communication From A Counterpart Application, Chinese Application No. 2013100377840, Chinese Search Report dated Oct. 23, 2014, 2 pages.
"Part 11: Wireless LAN Medium Access Control (MAC) and Physical Layer (PHY) Specifications," IEEE Standard for Information Technology—Telecommunications and Information Exchange between Systems—Local and Metropolitan Area Networks, Specific Requirements, IEEE Std 802.11, Jun. 12, 2007, 1232 pages.
Foreign Communication From A Counterpart Application, PCT Application No. PCT/CN2012/078656, English Translation of International Search Report dated Oct. 25, 2012, 3 pages.
Foreign Communication From A Counterpart Application, PCT Application No. PCT/CN2012/078656, English Translation of Written Opinion dated Oct. 25, 2012, 31 pages.
Foreign Communication From A Counterpart Application, Chinese Application No. 201310037784.0, Chinese Search Report dated Jun. 8, 2015, 2 pages.
Foreign Communication From A Counterpart Application, Chinese Application No. 201310037784.0, Chinese Office Action dated Jun. 16, 2015, 7 pages.

* cited by examiner

1110

Receive a broadcast frame sent by an AP, where the broadcast frame includes a second service identifier that corresponds to an M2M service supported by the AP — S 1112

Determine that the AP supports the M2M service when a first service identifier that corresponds to an M2M service supported by an M2M terminal matches the second service identifier — S 1114

| Send a probe request message to an AP, where the probe request message includes a first service identifier that corresponds to an M2M service supported by an M2M terminal | S 1122 |

| Receive a probe response message sent by the AP in response to the probe request message, where the probe response message includes a second service identifier that corresponds to an M2M service supported by the AP | S 1124 |

| Determine that the AP supports the M2M service when the first service identifier matches the second service identifier | S 1126 |

| Receive an association response message, an air-interface key agreement message, or an Extensible Authentication Protocol (EAP) success message that is sent by an AP, where the association response message, the air-interface key agreement message, or the EAP success message carries service configuration information that includes service information | S 1312 |

↓

| Send a resource request message to the AP, where the resource request message includes initial service time and a service duration that are determined by an M2M terminal according to the service information | S 1314 |

↓

| Receive a resource response message sent by the AP in response to the resource request message, where the resource response message includes initial service time and a service duration that are allocated by the AP for the M2M terminal according to the service information and the resource request message | S 1316 |

Receive an M2M data request message that is sent by an AP and includes report data indication information, or receive a broadcast frame that is sent by the AP and includes the report data indication information — S 1412

The AP sends a service data report message according to the report data indication information and service configuration information — S 1414

Receive a probe request message sent by an M2M terminal, where the probe request message includes a first service identifier that corresponds to an M2M service supported by the M2M terminal — S 2112

Determine that an AP supports the M2M service when a second service identifier that corresponds to an M2M service supported by the AP matches the first service identifier — S 2114

Send a probe response message to the M2M terminal, where the probe response message includes the second service identifier — S 2116

FIG. 8

METHOD, M2M TERMINAL, AP, AND SYSTEM FOR ACHIEVING MACHINE TO MACHINE SERVICE

CROSS-REFERENCE TO RELATED APPLICATIONS

This application is a continuation of International Application No. PCT/CN2012/078656, filed on Jul. 14, 2012, which claims priority to Chinese Patent Application No. 201110196951.7 filed on Jul. 14, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications, and in particular, to a method, a machine to machine (M2M) terminal, an access point (AP), and a system for achieving a machine to machine service in the communications field.

BACKGROUND

The technical team of wireless local area network standards (802.11) of the American Institute of Electrical and Electronics Engineers (IEEE), proposes that M2M services should be supported in a wireless fidelity (WiFi) network. In addition, a project is initiated to build an 802.11ah technical work team for M2M services.

As IEEE 802.11ah extends WiFi hotspot coverage from 100 meters to 1-2 kilometers, the application of the WiFi network will be increasingly popular. Carriers, such as China Telecom, China Mobile, and China Unicom, all will deploy their own WiFi networks. To achieve meter reading automation, M2M users, such as electric power companies, gas companies, and water supply companies, also will deploy their own WiFi networks and construct their own intelligent measurement systems for achieving the meter reading automation of the three kinds of meters. Environmental protection organizations, forest management departments, earthquake monitoring organizations, and the like also will deploy their own private WiFi networks to monitor and forecast environmental pollution, forest fires, earthquake disasters, and the like. In addition, public places, such as airports, stations, hotels, coffee houses, and the like also will deploy their own WiFi networks to issue information and for the convenience of subscribers to surf the Internet.

In sum, with the large-scale popularization of WiFi application, the low-cost advantage of a WiFi network will be increasingly obvious. In the same geographic region, it is possible that different carriers, industrial organizations, service departments, and the like simultaneously deploy WiFi networks. Therefore, the wide coverage of WiFi networks promotes the development of M2M services.

However, in another aspect, the wide coverage of WiFi networks also imposes higher requirements on achieving M2M services, for example, reducing power consumption of an M2M terminal, reducing signaling overhead of a system, and improving efficiency of executing an M2M service by a system.

Therefore, how to effectively achieve an M2M service in a WiFi network is a technical problem needing to be solved.

SUMMARY

Embodiments of the present invention provide a method, an M2M terminal, an AP, and a system for achieving a machine to machine service, so that the M2M service can be effectively achieved in a WiFi network.

In one aspect, an embodiment of the present invention provides a method for achieving a machine to machine service. This method includes: determining an AP that supports the M2M service; establishing a communication connection to the AP; receiving service configuration information sent by the AP; and sending a service data report message to the AP according to the service configuration information, where the service data report message includes service data corresponding to the M2M service.

In another aspect, an embodiment of the present invention provides a method for achieving a machine to machine service. This method includes: determining that an AP supports the M2M service; establishing a communication connection to an M2M terminal that supports the M2M service; sending service configuration information to the M2M terminal; and receiving a service data report message that is sent by the M2M terminal according to the service configuration information, where the service data report message includes service data corresponding to the M2M service.

In still another aspect, an embodiment of the present invention provides an M2M terminal for achieving a machine to machine service. This M2M terminal includes: a determining module configured to determine an AP that supports the M2M service; a connection module configured to establish a communication connection to the AP; a first receiving module configured to receive service configuration information sent by the AP; and a first sending module configured to send a service data report message to the AP according to the service configuration information, where the service data report message includes service data corresponding to the M2M service.

In still another aspect, an embodiment of the present invention provides an AP for achieving a machine to machine service. This AP includes: a first determining module configured to determine that the AP supports the M2M service; a connection module configured to establish a communication connection to an M2M terminal that supports the M2M service; a first sending module configured to send service configuration information to the M2M terminal; a first receiving module configured to receive a service data report message that is sent by the M2M terminal according to the service configuration information, where the service data report message includes service data corresponding to the M2M service.

In still another aspect, an embodiment of the present invention provides a system for achieving a machine to machine service. This system includes: an M2M terminal according to an embodiment of the present invention, an AP according to an embodiment of the present invention, and an M2M server. The M2M terminal includes: a first determining module configured to determine the AP that supports the M2M service; a first connection module configured to establish a communication connection to the AP; a first receiving module configured to receive service configuration information sent by the AP; and a first sending module configured to send a service data report message to the AP according to the service configuration information, where the service data report message includes service data corresponding to the M2M service. The AP includes: a second determining module configured to determine that the AP supports the M2M service; a second connection module configured to establish a communication connection to the M2M terminal that supports the M2M service; a second sending module configured to send the service configuration information to the M2M terminal; and a second receiving module configured to receive the service data report message that is sent by the M2M terminal according to the service configuration information, where the service data report message includes the service data corresponding to the M2M service.

Based on the preceding technical solutions, the method, M2M terminal, AP, and system for achieving a machine to machine service in the embodiments of the present invention are capable of effectively achieving an M2M service in a WiFi network, thereby reducing power consumption, reducing system signaling overhead, and improving system efficiency.

BRIEF DESCRIPTION OF THE DRAWINGS

To illustrate the technical solutions in the embodiments of the present invention more clearly, the following briefly describes the accompanying drawings required for describing the embodiments of the present invention. The accompanying drawings in the following description merely show some embodiments of the present invention, and persons of ordinary skill in the art can derive other drawings from these accompanying drawings without creative efforts.

FIG. 3 is a schematic flow chart of a method for determining an AP that supports an M2M service according to an embodiment of the present invention;

FIG. 4 is a schematic flow chart of another method for determining an AP that supports an M2M service according to an embodiment of the present invention;

FIG. 5 is a schematic flow chart of a method for receiving service configuration information according to an embodiment of the present invention;

FIG. 6 is a schematic flow chart of a method for sending a service data report message according to an embodiment of the present invention;

FIG. 8 is a schematic flow chart of a method for determining that an AP supports an M2M service according to another embodiment of the present invention;

DETAILED DESCRIPTION

The following clearly and completely describes the technical solutions according to the embodiments of the present invention with reference to the accompanying drawings in the embodiments of the present invention. The embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
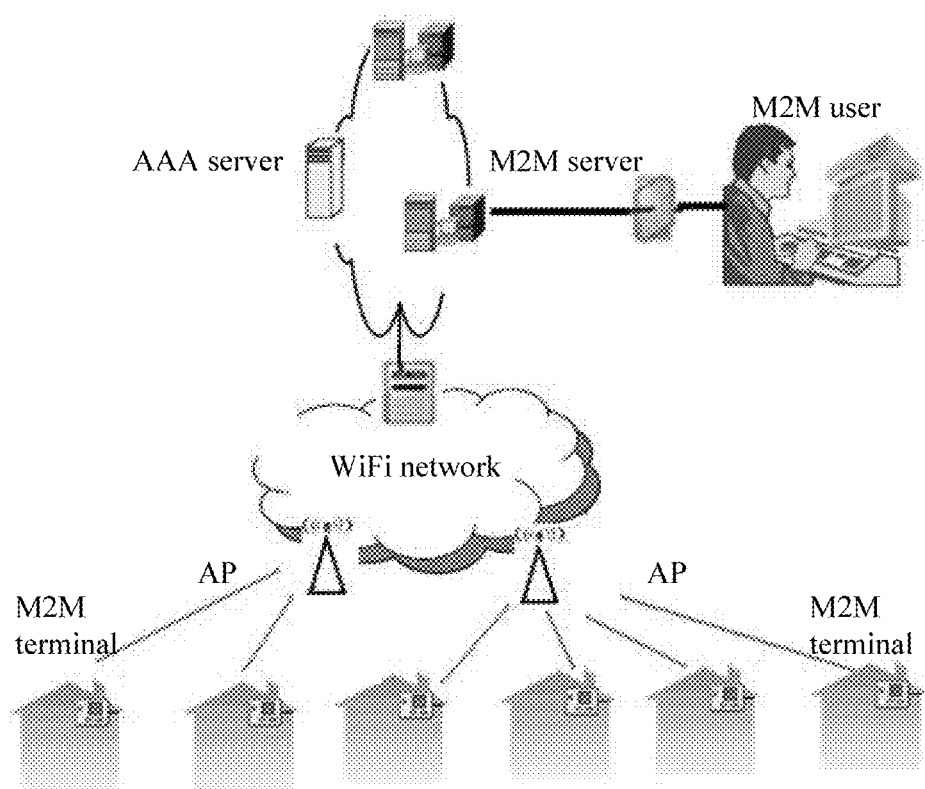
FIG. 1 is a schematic diagram of network architecture for an M2M service according to an embodiment of the present invention.

FIG. 1 is a schematic diagram of network architecture for an M2M service according to an embodiment of the present invention. As shown in FIG. 1, in a residential community, automatic meter reading is mainly used by energy companies, such as electric power companies, water supply companies, and gas companies, to record and monitor usage data of users. Automatic meter reading is not only capable of saving the costs of manual meter reading but also capable of adjusting energy supply in different regions in real time. In this application scenario, sensors are installed in instruments, such as electricity meters, water meters, and gas meters, inside houses of users. These sensors communicate with a corresponding M2M server by using an AP provided by a WiFi network to report energy consumption data. In this case, M2M users, such as energy companies, are capable of analyzing and processing data of these M2M terminals. Furthermore, if automatic meter reading combines with home automation, energy companies are capable of delivering control and diagnosis signaling in real time by monitoring and analyzing user data to help users save energy or to provide alarms for users. In an embodiment of the present invention, an electric company being an M2M user and automatically acquiring a degree of electric power consumed by a home user is taken as an example for description. However, the present invention is not limited thereto.

Figure 2:
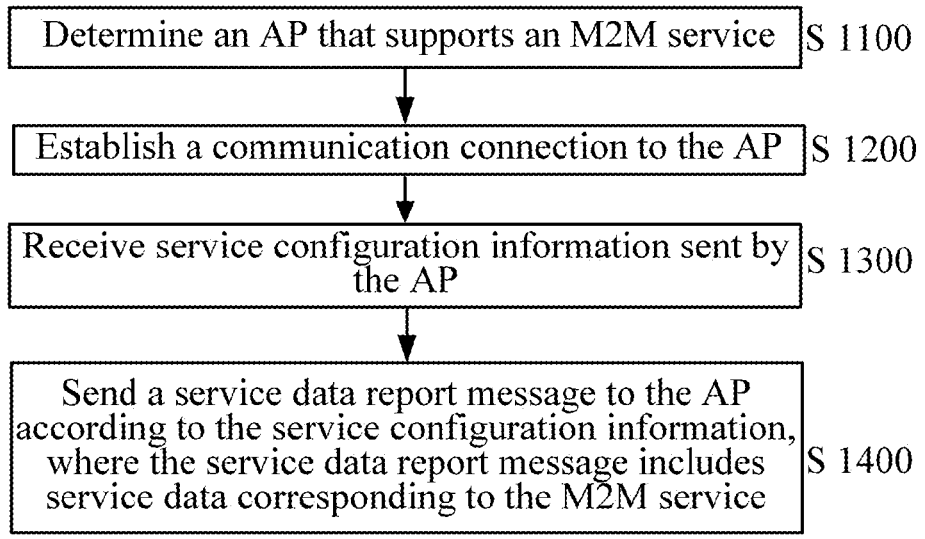
FIG. 2 is a schematic flow chart of a method for achieving an M2M service according to an embodiment of the present invention.

FIG. 2 is a schematic flow chart of a method 1000 for achieving an M2M service according to an embodiment of the present invention, to effectively achieve an M2M service in a WiFi network. As shown in FIG. 2, the method 1000 includes:

S1100. Determine an AP that supports the M2M service;
S1200. Establish a communication connection to the AP;

S1300. Receive service configuration information sent by the AP; and

S1400. Send a service data report message to the AP according to the service configuration information, where the service data report message includes service data corresponding to the M2M service.

An M2M terminal may first determine an access point AP that supports the M2M service, and establish a communication connection to the AP. After receiving service configuration information sent by the AP, the M2M terminal may send a service data report message to the AP according to the service configuration information, where the service data report message includes service data corresponding to the M2M service. Then, the AP may send the service data to a corresponding M2M server. In this way, the M2M service can be effectively achieved in the WiFi network using the method according to the embodiment of the present invention.

According to the method for achieving a machine to machine service in the embodiment of the present invention, an M2M terminal first determines an AP that supports the corresponding M2M service, and establishes a communication connection to the AP. In this way, an AP that meets a service requirement of the M2M terminal can be quickly detected, and it is avoided that the M2M terminal can detect the AP that supports the corresponding service only after multiple attempts to access a WiFi network are performed and authentication is successful, thereby improving network discovery efficiency, reducing power consumption of the M2M terminal in a network discovery phase, and reducing system signaling overhead.

It should be understood that the M2M service described in the foregoing is an M2M service supported by the M2M terminal by default. Unless otherwise specified, in other embodiments of the present invention, the M2M service is an M2M service supported by the M2M terminal by default. For brevity, this will not be described repeatedly in the following.

In S1100, optionally, the M2M terminal determines, according to a first service identifier and a second service identifier, the AP that supports the M2M service. The first service identifier corresponds to the M2M service supported by the M2M terminal, and the second service identifier corresponds to the M2M service supported by the AP. Optionally, the first service identifier includes at least one among an M2M user identifier, an M2M server identifier, and a service type that correspond to the M2M service supported by the M2M terminal; and the second service identifier includes at least one among an M2M user identifier, an M2M server identifier, and a service type that correspond to the M2M service supported by the AP. The M2M server identifier is the identifier of an M2M server corresponding to the M2M service, that is, the identifier of an M2M server supporting the M2M service. The M2M server identifier may include: the Internet Protocol (IP) address, the uniform resource locator (URL) address, or the like of the M2M server.

In the embodiment of the present invention, if the AP records a mapping between an M2M terminal identifier and information such as the IP address of the corresponding M2M service server and the URL address of the M2M server, the first service identifier may further include the M2M terminal identifier. That is, the first service identifier includes at least one among the M2M user identifier, the M2M server identifier, the M2M terminal identifier, and the service type that correspond to the M2M service supported by the M2M terminal; and the second service identifier includes at least one among the M2M user identifier, the M2M server identifier, the M2M terminal identifier, and the service type that correspond to the M2M service supported by the AP. The M2M terminal identifier may be the media access control (MAC) address, the IP address, or the like of the M2M terminal.

Specifically, the following describes a method for an M2M terminal determining an AP that supports an M2M service with reference to FIG. 3 and FIG. 4. As shown in FIG. 3, a method 1110 for an M2M terminal determining an AP that supports an M2M service includes:

S1112. An M2M terminal receives a broadcast frame sent by an AP, where the broadcast frame carries a second service identifier that corresponds to an M2M service supported by the AP; and S1114. The M2M terminal determines the AP that supports the M2M service, where the determining, by the M2M terminal, the AP that supports the M2M service specifically includes: when a first service identifier matches the second service identifier, determining, by the M2M terminal, that the AP supports the M2M service.

Optionally, the second service identifier includes at least one among an M2M user identifier, an M2M server identifier, an M2M terminal identifier, and a service type that correspond to the M2M service supported by the AP. Likewise, the M2M server identifier may be the IP address, the URL address, or the like of an M2M server supporting the M2M service; and the M2M terminal identifier may be the MAC address, the IP address, or the like of the M2M terminal.

For example, during network discovery, the M2M terminal receives a beacon frame that is periodically sent by the AP, and performs matching between the second service identifier carried in the beacon frame and the first service identifier. If the second service identifier matches the first service identifier, it may be determined that the AP supports the M2M service; if the second service identifier does not match the first service identifier, it is determined that the AP does not support the M2M service. It should be understood that if an M2M terminal determines multiple APs that support the M2M service, the M2M terminal may finally determine a suitable AP according to the signal strength of a received beacon frame and establish a communication connection to the AP.

It should be understood that, in the embodiment of the present invention, whether the first service identifier matches the second service identifier may be determined by determining whether the first service identifier is the same as the second service identifier or whether the first service identifier corresponds to the second service identifier. For example, whether the first service identifier matches the second service identifier may be determined by determining whether the M2M user identifier included in the first service identifier is the same as the M2M user identifier included in the second service identifier; and whether the first service identifier matches the second service identifier may also be determined by determining whether the M2M server identifier included in the first service identifier corresponds to the M2M terminal identifier included in the second service identifier, for example, whether the M2M server identifier and the M2M terminal identifier correspond to the same service type.

Therefore, by receiving the beacon frame periodically sent by the AP and according to whether the second service identifier that corresponds to the M2M service supported by the AP and is carried in the beacon frame matches the first service identifier, the M2M terminal is capable of quickly determining the AP meeting its service requirement, thereby improving network discovery efficiency, reducing power consumption, and reducing system signaling overhead.

FIG. 4 is a schematic flow chart of another method 1120 for determining an AP that supports an M2M service according to an embodiment of the present invention. As shown in FIG. 4, the method 1120 includes:

S1122. An M2M terminal sends a probe request message to an AP, where the probe request message includes a first service identifier;

S1124. The M2M terminal receives a probe response message sent by the AP in response to the probe request message, where the probe response message includes a second service identifier that corresponds to an M2M service supported by the AP; and S1126. The M2M terminal determines the AP that supports the M2M service, where the determining, by the M2M terminal, the AP that supports the M2M service specifically includes: when the first service identifier matches the second service identifier, determining, by the M2M terminal, that the AP supports the M2M service.

Optionally, the second service identifier includes at least one among an M2M user identifier, an M2M server identifier, an M2M terminal identifier, and a service type that corresponds to the M2M service supported by the AP.

For example, during network discovery, to determine a suitable AP, the M2M terminal may actively send a probe request message to an AP, where the probe request message includes the first service identifier that corresponds to an M2M service supported by the M2M terminal. After receiving the probe request message, the AP may perform matching between the second service identifier that corresponds to the M2M service supported by the AP and the first service identifier. If it is determined that the second service identifier matches the first service identifier, the AP may send a probe response message to the M2M terminal, where the probe response message includes the second service identifier. If the second service identifier does not match the first service identifier, the AP may not send the probe response message to the M2M terminal that sends the probe request, or the probe response message sent to the M2M terminal includes indication information indicating that the M2M service corresponding to the first service identifier is not supported. Therefore, the M2M terminal may perform matching between the first service identifier and the second service identifier, and determine that the AP supports the M2M service when determining that the first service identifier matches the second service identifier. Optionally, the M2M terminal may also determine that the AP supports the M2M service according to the second service identifier that is carried in the probe response message sent by the AP, or determine that the AP does not support the M2M service according to the indication information in the probe response message.

Therefore, by receiving the probe response message sent by the AP and according to whether the second service identifier included in the probe response message matches the first service identifier, the M2M terminal is capable of quickly determining the AP meeting its service requirement, thereby improving network discovery efficiency, reducing power consumption, and reducing system signaling overhead.

It should be understood that, in the embodiment of the present invention, if the M2M server identifier of an M2M server supporting the M2M service is preset only in the M2M terminal, the M2M terminal may determine, according to the M2M server identifier, or according to at least one among the M2M server identifier, the M2M user identifier, the M2M terminal identifier, and the service type, the AP that supports the M2M service. In this case, service configuration information sent by the AP and received by the M2M terminal may exclude the M2M server identifier. Certainly, the service configuration information may also include the M2M server identifier. However, a service data report message sent by the M2M terminal to the AP needs to include the M2M server identifier, so that the AP is capable of sending service data of the M2M terminal to the corresponding M2M server.

Likewise, in the embodiment of the present invention, if the M2M server identifier is not preset in the M2M terminal, the M2M terminal may determine the AP that supports the M2M service according to at least one among the M2M user identifier, the M2M terminal identifier, and the service type in the first service identifier. In this case, the service configuration information sent by the AP and received by the M2M terminal needs to include the M2M server identifier. Because the AP learns the M2M server identifier corresponding to the M2M terminal, the service data report message sent by the M2M terminal to the AP does not need to include the M2M server identifier. Certainly, the service data report message may also include the M2M server identifier.

It should further be understood that when an M2M user is provisioning an M2M service, at least one among an M2M user identifier, an M2M terminal identifier, and a service type that correspond to the M2M service is preset in the M2M terminal; in another aspect, a WiFi network provider configures, in the AP according to service information of an M2M service subscribed with the M2M user, at least one among an M2M user identifier, an M2M terminal identifier, and a service type that correspond to an M2M service supported by the network.

In S1200, after determining the AP that supports the M2M service, the M2M terminal establishes a communication connection to the AP. It should be understood that the M2M terminal and the AP may adopt a protocol in a related technology to establish the communication connection, for example, establishing the communication connection according to the 802.11 protocol. For example, the M2M terminal establishes the communication connection to the AP by using operations such as system authentication and association.

In S1300, the M2M terminal receives the service configuration information sent by the AP. Optionally, the M2M terminal receives an association response message, an air-interface key agreement message, or an Extensible Authentication Protocol (EAP) success message, where the association response message, the air-interface key agreement message, or the EAP success message includes the service configuration information. In addition, the service configuration information includes service information.

It should be understood that after EAP authentication is completed, the AP may send the service configuration information to the M2M terminal by using the third message M3 in 4-way handshake during negotiating a key with the M2M terminal by using the 4-way handshake. That is, the M2M terminal may receive an air-interface key agreement message sent by the AP, where the air-interface key agreement message includes the service configuration information. The feature of this solution is that a negotiated air-interface key can be used to encrypt the service configuration information, thereby enhancing the security of the service configuration information.

Optionally, the service configuration information or the service data report message includes the M2M server identifier. Optionally, the service information of the service configuration information includes a service data sending period.

In the embodiment of the present invention, after receiving the service information from the M2M server, an AP apparatus may configure different service time information for different M2M terminals according to the service information. The service information may include the service data sending period and the service time information may include initial service time and a service duration. In this way, each M2M terminal reports service data to the M2M server in the specified service duration according to the specified period and initial service time. Therefore, conflicts occurring when multiple M2M terminals simultaneously report service data can be avoided, thereby improving system operational efficiency.

Therefore, the service configuration information received by the M2M terminal using the association response message, the air-interface key agreement message, or the EAP success message may include: the service data sending period, the initial service time, and the service duration.

In an embodiment of the present invention, after the M2M terminal receives the service configuration information sent by the AP, the method according to the embodiment of the present invention may further include: negotiating a data transmission mechanism with the AP according to the service configuration information. As shown in FIG. 5, a method 1310 for receiving service configuration information according to another embodiment of the present invention may include:

S1312. An M2M terminal receives an association response message, an air-interface key agreement message, or an EAP success message sent by the AP, where the association response message, the air-interface key agreement message, or the EAP success message includes the service configuration information; and the M2M terminal negotiates a data transmission mechanism with the AP according to the service configuration information. In this case, the M2M terminal may send a service data report message to the AP according to the service configuration information and the result of the negotiation with the AP about the data transmission mechanism.

Optionally, the negotiating, by the M2M terminal, the data transmission mechanism with the AP according to the service configuration information includes:

S1314. The M2M terminal sends a resource request message to the AP, where the resource request message includes initial service time and a service duration that are determined by the M2M terminal according to the service information; and S1316. The M2M terminal receives a resource response message sent by the AP in response to the resource request message, where the resource response message includes initial service time and a service duration that are allocated by the AP for the M2M terminal according to the service information and the resource request message.

In the embodiment of the present invention, after receiving the resource request message, the AP may accept the initial service time and the service duration that are determined by the M2M terminal according to the service configuration information. In this case, the AP may directly send a resource response message to the M2M terminal in response to the resource request message, where the resource response message may not carry the initial service time and the service duration. Certainly, the resource response message may also carry the initial service time and the service duration. In this way, after receiving the resource response message, the M2M terminal may determine that the AP approves the initial service time and the service duration that are determined by the M2M terminal according to the service configuration information.

If after receiving the resource request message, the AP does not accept the initial service time and the service duration that are determined by the M2M terminal according to the service configuration information, the AP sends a resource response message to the M2M terminal in response to the resource request message, where the resource response message includes the initial service time and the service duration that are allocated by the AP for the M2M terminal.

In this way, the M2M terminal may acquire, according to the resource response message sent by the AP, the initial service time and the service duration that are used to report service data, thereby avoiding uploading data conflicts and improving system efficiency.

Therefore, according to the method for achieving a machine to machine service in the embodiment of the present invention, an AP sends service configuration information to an M2M terminal by using an association response message, an air-interface key agreement message, or an EAP success message, thereby reducing air-interface message interaction between the M2M terminal and the AP, and saving power of the M2M terminal. In addition, the AP allocates service time information for the M2M terminal or the M2M terminal negotiates a data transmission mechanism with the AP, thereby avoiding conflicts occurring when multiple M2M terminals simultaneously report service data. In this way, system operational efficiency can be improved.

In S1400, the M2M terminal sends a service data report message to the AP according to the service configuration information, where the service data report message includes the M2M server identifier and service data corresponding to the M2M service.

For example, the M2M terminal wakes up according to the specified period and initial service time, and sends the service data report message to the AP in the specified service duration according to the service data sending period, initial service time, and service duration included in the service configuration information. After receiving the service data sent by each M2M terminal, the AP may centralize the service data sent by at least one M2M terminal corresponding to the same M2M service, and then send the service data to an M2M server supporting the M2M service. In this way, the data reporting process can be simplified and the transmission efficiency of a WiFi network can be improved.

In an embodiment of the present invention, the M2M terminal also may wake up according to the specified period and initial service time, waiting to receive report data indication information periodically sent by the AP to the M2M terminal at the specified time. The M2M terminal reports service data to the AP only after receiving the report data indication information sent by the AP. After waking up, if the M2M terminal does not receive the report data indication information from the AP in the specified service duration, the M2M terminal does not need to report data. As shown in FIG. 6, a method 1410 for sending a service data report message according to an embodiment of the present invention includes:

S1412. An M2M terminal receives an M2M data request message sent by an AP or receives a broadcast frame sent by the AP, where the M2M data request message or the broadcast frame includes report data indication information; and S1414. The M2M terminal sends a service data report message to the AP. Specifically, the sending, by the M2M terminal, the service data report message to the AP includes: sending, by the M2M terminal, the service data report message to the AP according to the report data indication information and service configuration information.

Optionally, the service data report message is a MAC-layer message. Optionally, the M2M data request message also is a MAC-layer message. In this way, the M2M terminal is capable of skipping the process of acquiring the IP address of the AP, thereby reducing overhead of an IP packet header each time when data is reported, and improving transmission efficiency.

Therefore, according to the method for achieving a machine to machine service in the embodiment of the present invention, an AP centralizes service data sent by at least one M2M terminal corresponding to the same M2M service, and sends the service data to an M2M server supporting the M2M service, thereby simplifying the data reporting process and improving transmission efficiency of a WiFi network. In addition, the M2M terminal communicates with the AP by using a MAC-layer message and transmits the service data according to service configuration information, thereby reducing system overhead, reducing power consumption, avoiding transmission conflicts, and improving system transmission efficiency.

It should be understood that, the sequence numbers of the above steps do not imply an execution sequence, and the execution sequence of the steps should be determined according to the functions and internal logic, which is not intended to limit the implementation process of the embodiments of the present invention in any way.

With reference to FIG. 2 to FIG. 6, the foregoing describes the method for achieving an M2M service according to the embodiment of the present invention from the standpoint of an M2M terminal in detail. With reference to FIG. 7 to FIG. 13, the following describes the method for achieving an M2M service according to the embodiment of the present invention from the standpoint of an AP in detail.

Figure 7:
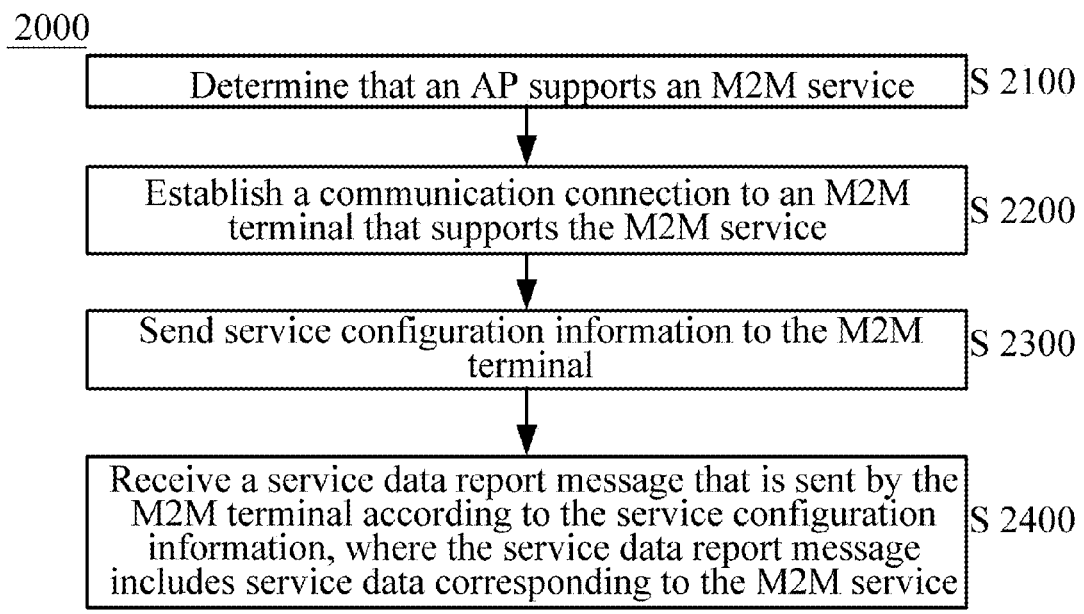
FIG. 7 is a schematic flow chart of a method for achieving an M2M service according to another embodiment of the present invention.

FIG. 7 is a schematic flow chart of a method 2000 for achieving an M2M service according to another embodiment of the present invention. As shown in FIG. 7, the method 2000 includes:

S2100. An AP determines that it supports the machine to machine M2M service;

S2200. The AP establishes a communication connection to an M2M terminal supporting the M2M service;

S2300. The AP sends service configuration information to the M2M terminal; and

S2400. The AP receives a service data report message that is sent by the M2M terminal according to the service configuration information, where the service data report message includes service data corresponding to the M2M service.

According to the method for achieving a machine to machine service in the embodiment of the present invention, an AP determines that it supports the corresponding M2M service and establishes a communication connection to an M2M terminal supporting the M2M service. In this way, an AP that meets a service requirement of the M2M terminal can be quickly detected, and it is avoided that the M2M terminal can detect the AP that supports the corresponding service only after multiple attempts to access a WiFi network are performed and authentication is successful, thereby improving network discovery efficiency, reducing power consumption of the M2M terminal in a network discovery phase, and reducing system signaling overhead.

In S2100, optionally, the AP determines that it supports the M2M service according to a first service identifier and a second service identifier. The first service identifier corresponds to an M2M service supported by the M2M terminal, and the second service identifier corresponds to an M2M service supported by the AP. Optionally, the first service identifier includes at least one among an M2M user identifier, an M2M server identifier, an M2M terminal identifier, and a service type that correspond to the M2M service supported by the M2M terminal; and the second service identifier includes at least one among an M2M user identifier, an M2M server identifier, an M2M terminal identifier, and a service type that correspond to the M2M service supported by the AP. The M2M server identifier may be the IP address, the URL address, or the like of an M2M server supporting the M2M service; and the M2M terminal identifier may be the MAC address, the IP address, or the like of the M2M terminal.

Specifically, FIG. 8 is a schematic flow chart of a method 2110 for determining that an AP supports an M2M service according to another embodiment of the present invention. As shown in FIG. 8, the method 2110 includes:

S2112. An AP receives a probe request message sent by an M2M terminal, where the probe request message includes a first service identifier;

S2114. The AP determines that it supports the M2M service, where the determining, by the AP, that it supports the M2M service specifically includes: when a second service identifier matches the first service identifier, determining that the AP supports the M2M service; and S2116. The AP sends a probe response message to the M2M terminal, where the probe response message includes the second service identifier.

Optionally, the second service identifier includes at least one among an M2M user identifier, an M2M server identifier, an M2M terminal identifier, and a service type that correspond to the M2M service supported by the AP. Likewise, the M2M server identifier may be the IP address, the URL address, or the like of an M2M server supporting the M2M service; and the M2M terminal identifier may be the MAC address, the IP address, or the like of the M2M terminal.

In the embodiment of the present invention, the AP performs matching between the first service identifier and the second service identifier. If the AP determines that the second service identifier matches the first service identifier, the AP determines that it supports the M2M service. Then, the AP may send the probe response message to the M2M terminal in response to the probe request message, where the probe response message includes the second service identifier. If the second service identifier does not match the first service identifier, the AP determines that it does not support the M2M service. In this case, the AP may not send the probe response message to the M2M terminal, or the probe response message includes indication information indicating that the M2M service corresponding to the first service identifier is not supported. Therefore, the M2M terminal may perform matching between the first service identifier and the second service identifier, and determine that the AP supports the M2M service when determining that the first service identifier matches the second service identifier. Optionally, the M2M terminal may also directly determine that the AP supports the M2M service according to the second service identifier that is carried in the probe response message sent by the AP, or determine that the AP does not support the M2M service according to the indication information in the probe response message.

Optionally, the AP may also carry the second service identifier in a beacon frame that is periodically sent to the M2M terminal, and the M2M terminal performs matching between the first service identifier and the second service identifier to determine whether the AP supports the M2M service.

Therefore, according to whether the first service identifier matches the second service identifier, the AP is capable of quickly determining whether it supports the M2M service, thereby improving network discovery efficiency, reducing power consumption, and reducing system signaling overhead.

It should be understood that, in the embodiment of the present invention, if the M2M server identifier of an M2M server supporting the M2M service is preset only in the M2M terminal, the AP may determine, according to the M2M server identifier, or according to at least one among the M2M server identifier, the M2M user identifier, the M2M terminal identifier, and the service type, that it supports the M2M service. In this case, service configuration information sent by the AP to the M2M terminal may exclude the M2M server identifier. Certainly, the service configuration information may also include the M2M server identifier. However, a service data report message sent by the M2M terminal to the AP needs to include the M2M server identifier, so that the AP is capable of sending service data of the M2M terminal to the corresponding M2M server.

Likewise, in the embodiment of the present invention, if the M2M server identifier is not preset in the M2M terminal, the AP may determine that it supports the M2M service according to at least one among the M2M user identifier, the M2M terminal identifier, and the service type in the first service identifier. In this case, the service configuration information sent by the AP to the M2M terminal needs to include the M2M server identifier. Because the AP learns the M2M server identifier corresponding to the M2M terminal, the service data report message sent by the M2M terminal to the AP does not need to include the M2M server identifier. Certainly, the service data report message may also include the M2M server identifier.

It should further be understood that when an M2M user is provisioning an M2M service, a WiFi network provider configures, in the AP according to service information of a subscribed M2M service, at least one among an M2M user identifier, an M2M terminal identifier, and a service type that correspond to an M2M service supported by the network. It should further be understood that in the embodiment of the present invention, whether the first service identifier matches the second service identifier may be determined by determining whether the first service identifier is the same as the second service identifier or whether the first service identifier corresponds to the second service identifier.

In S2200, after determining that it supports the M2M service, the AP establishes a communication connection to the M2M terminal supporting the M2M service. It should be understood that, the AP and the M2M terminal may adopt a protocol in a related technology to establish the communication connection, for example, establishing the communication connection according to the 802.11 protocol. For example, the AP may establish the communication connection to the M2M terminal by using operations such as system authentication and association.

In S2300, the AP sends the service configuration information to the M2M terminal. This includes: sending, by the AP, an association response message, an air-interface key agreement message, or EAP success message to the M2M terminal, where the association response message, the air-interface key agreement message, or the EAP success message includes the service configuration information. Optionally, the service configuration information or the service data report message includes the M2M server identifier corresponding to the M2M service.

With reference to FIG. 9 to FIG. 12, the following describes a method for an AP sending service configuration information according to the embodiment of the present invention in detail.

Figure 9:
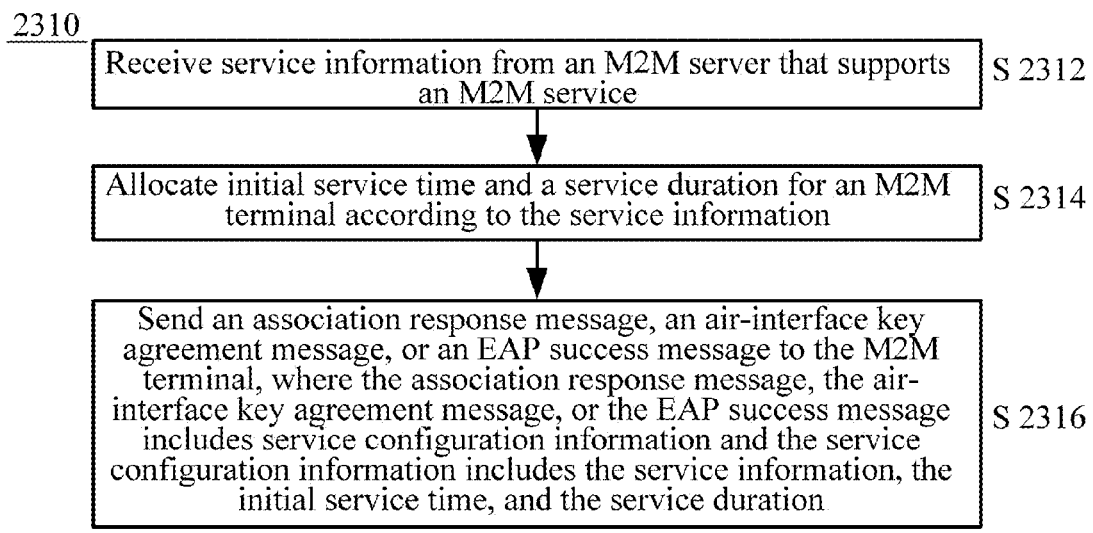
FIG. 9 is a schematic flow chart of a method for sending service configuration information according to another embodiment of the present invention.

As shown in FIG. 9, a method 2310 for sending service configuration information according to an embodiment of the present invention includes:

S2312. An AP receives service information from an M2M server supporting an M2M service; and S2316. The AP sends service configuration information to an M2M terminal. Optionally, the AP sends an association response message, an air-interface key agreement message, or an EAP success message to the M2M terminal, where the association response message, the air-interface key agreement message, or the EAP success message includes the service configuration information, and the service configuration information includes the service information. Optionally, the service information includes a service data sending period.

By using a message during extensible association or EAP authentication, the AP delivers the service configuration information to the M2M terminal, thereby reducing air-interface message interaction between the AP and the M2M terminal, reducing power consumption of the M2M terminal, and improving system efficiency.

To avoid conflicts occurring when multiple M2M terminals simultaneously report service data, the AP may allocate service time information for the M2M terminal, and the M2M terminal may also negotiate a data transmission mechanism with the AP. This is described in the following.

As shown in FIG. 9, after the AP receives the service information, the method 2310 may further include:

S2314. The AP allocates the service time information for the M2M terminal according to the service information, where the service time information includes initial service time and a service duration.

S2316 includes: sending, by the AP, the service configuration information to the M2M terminal, where the service configuration information includes the service information and the service time information that are determined according to the service information. That is, the service configuration information includes the service information, the initial service time, and the service duration.

Optionally, the service information includes at least one among the service data sending period, a service data format, and a service data amount.

Therefore, the M2M terminal is capable of reporting service data according to the service information and the service time information, thereby avoiding conflicts, improving service data reporting efficiency, and reducing power consumption of the M2M terminal.

Figure 10:
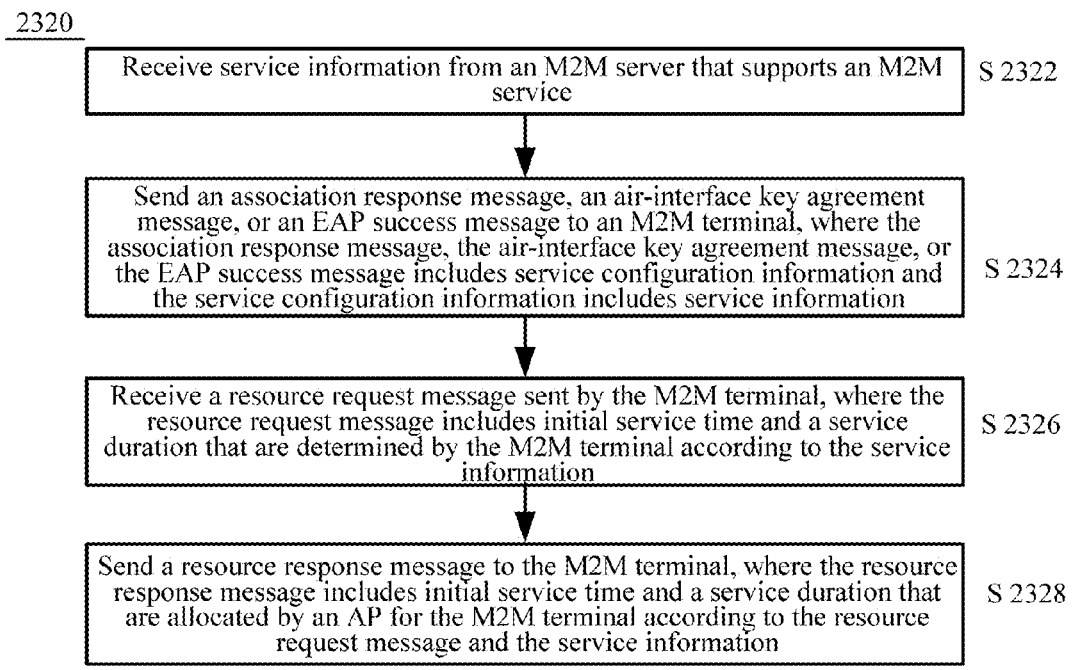
FIG. 10 is a schematic flow chart of another method for sending service configuration information according to another embodiment of the present invention.

FIG. 10 is a schematic flow chart of another method 2320 for sending service configuration information according to another embodiment of the present invention. As shown in FIG. 10, the method 2320 includes:

S2322. An AP receives service information from an M2M server supporting an M2M service; and S2324. The AP sends an association response message, an air-interface key agreement message, or an EAP success message to an M2M terminal, where the association response message, the air-interface key agreement message, or the EAP success message includes the service configuration information, the service configuration information includes the service information, and optionally, the service information includes a service data sending period.

A data transmission mechanism is negotiated with the M2M terminal according to the service information, so that the M2M terminal sends a service data report message to the AP according to the service information and the result of the negotiation with the M2M terminal about the data transmission mechanism.

Optionally, the negotiating the data transmission mechanism with the M2M terminal according to the service information includes:

S2326. The AP receives a resource request message sent by the M2M terminal, where the resource request message includes initial service time and a service duration that are determined by the M2M terminal according to the service information; and S2328. The AP sends a resource response message to the M2M terminal, where the resource response message includes the initial service time and the service duration that are allocated for the M2M terminal by the AP according to the resource request message and the service information, so that the M2M terminal sends the service data report message according to the service information, the initial service time, and the service duration.

In the embodiment of the present invention, after receiving the resource request message, if the AP accepts the initial service time and the service duration that are determined by the M2M terminal according to the service configuration information, the AP may directly send a resource response message to the M2M terminal in response to the resource request message, where the resource response message may not carry the initial service time and the service duration. Certainly, the resource response message may also carry the initial service time and the service duration. In this way, after receiving the resource response message, the M2M terminal may determine that the AP approves the initial service time and the service duration that are determined by the M2M terminal according to the service configuration information.

If after receiving the resource request message, the AP does not accept the initial service time and the service duration that are determined by the M2M terminal according to the service configuration information, the AP sends a resource response message to the M2M terminal in response to the resource request message, where the resource response message includes the initial service time and the service duration that are allocated by the AP for the M2M terminal. In this way, the M2M terminal may acquire, according to the resource response message, the initial service time and the service duration that are used to report service data.

Therefore, according to the method for achieving a machine to machine service in the embodiment of the present invention, an AP sends service configuration information to an M2M terminal by using an association response message, an air-interface key agreement message, or an EAP success message, thereby reducing air-interface message interaction between the M2M terminal and the AP, and saving power of the M2M terminal. In addition, the AP allocates service time information for the M2M terminal or the M2M terminal negotiates a data transmission mechanism with the AP, thereby avoiding conflicts occurring when multiple M2M terminals simultaneously report service data. In this way, system operational efficiency can be improved.

Figure 11:
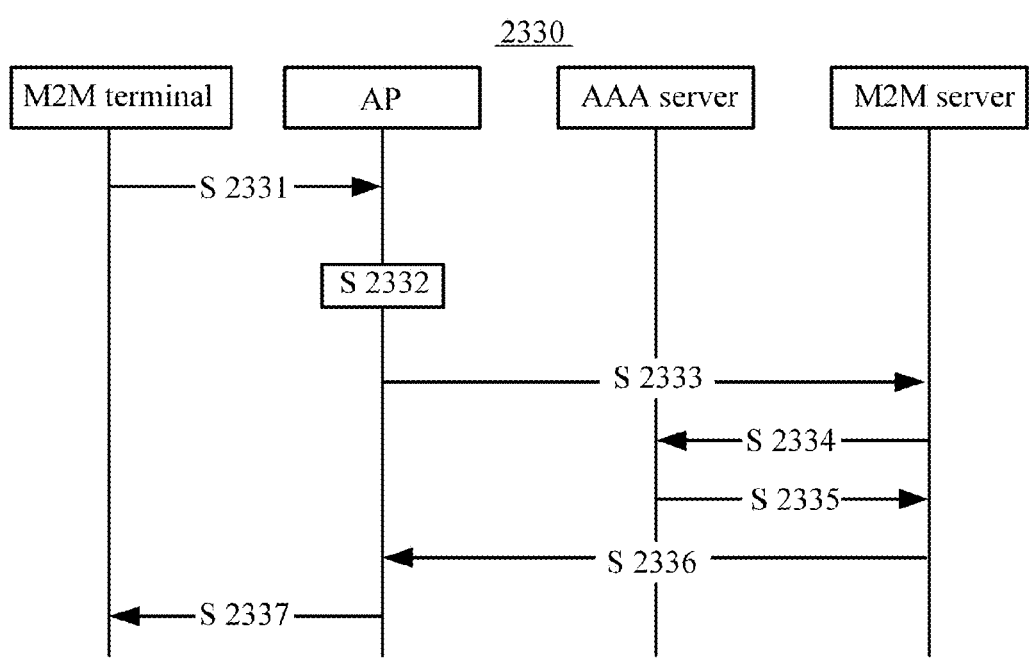
FIG. 11 is a schematic flow chart of still another method for sending service configuration information according to another embodiment of the present invention.
Figure 12:
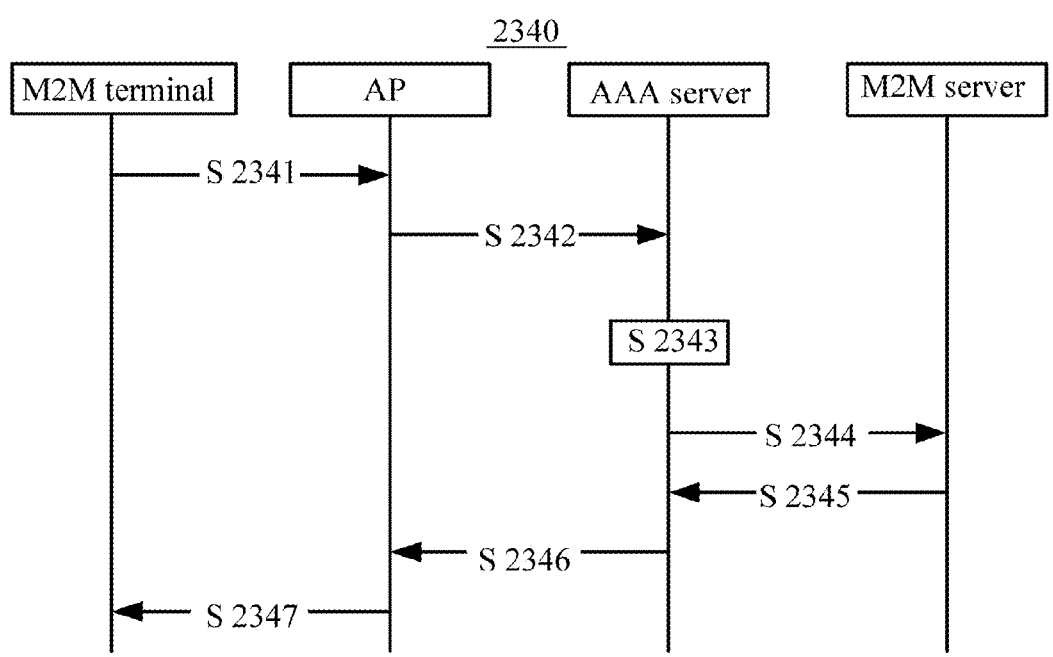
FIG. 12 is a schematic flow chart of still another method for sending service configuration information according to another embodiment of the present invention.

With reference to FIG. 11 and FIG. 12, the following describes a method 2330 and a method 2340 for sending service configuration information according to embodiments of the present invention in detail.

As shown in FIG. 11, in S2331, an AP receives an association request message sent by an M2M terminal, where the association request message includes a first service identifier that corresponds to an M2M service supported by the M2M terminal, and registration request indication information.

For example, after detecting a network supporting its service, the M2M terminal may perform system authentication by using a preset shared key. After the authentication is successful, the M2M terminal sends the association request message to the AP. The message carries the first service identifier, where the first service identifier may include at least one among an M2M user identifier, an M2M server identifier, an M2M terminal identifier, and a service type that correspond to the M2M service supported by the M2M terminal.

In S2332, the AP determines, according to the first service identifier, an M2M server supporting the M2M service. For example, the AP may determine the M2M server according to the M2M user identifier, the M2M server identifier, or the like and register with the M2M server on behalf of the M2M terminal.

In S2333, the AP sends a registration request message to the M2M server according to the registration request indication information, where the registration request message includes the M2M terminal identifier. The registration request message may further include a ciphertext generated from a segment of known plaintext that is encrypted using the shared key.

In S2334, the M2M server sends an access request message to an authentication, authorization, and accounting (AAA) server, where the access request message includes the M2M terminal identifier and the ciphertext so that the M2M server uses the ciphertext to further confirm the validity of the M2M terminal with the AAA server.

In S2335, the M2M server receives an access response message sent by the AAA server in response to the access request message.

In S2336, after the M2M server confirms the validity of the M2M terminal and completes registration, the AP receives a registration response message sent by the M2M server, where the registration response message includes service information. Optionally, the service information includes at least one among a service data sending period, a service data format, a service data amount, and the address of the M2M server.

In S2337, the AP sends an association response message to the M2M terminal, where the association response message carries service configuration information that includes the service information.

It should be understood that, the AP may also allocate information such as initial service time and a service duration for the M2M terminal, or negotiate the information with the M2M terminal, and may send the information to the M2M terminal by using the association response message, an air-interface key agreement message, or a resource response message, so that the M2M terminal reports service data in the specified service duration according to the period and the initial service time. For brevity, details are not described herein.

FIG. 12 shows another method 2340 for sending service configuration information according to an embodiment of the present invention. As shown in FIG. 12, in S2341, an AP receives an association request message sent by an M2M terminal, where the association request message includes a first service identifier that corresponds to an M2M service supported by the M2M terminal, and registration request indication information.

In S2342, the AP sends an access request message to an AAA server according to the registration request indication information, where the access request message includes the first service identifier and the registration request indication information.

In S2343, the AAA server determines, according to the first service identifier, an M2M server supporting the M2M service.

In S2344, the AAA server sends a registration request message to the determined M2M server according to the registration request indication information, where the registration request message includes an M2M terminal identifier.

In S2345, the AAA server receives a registration response message sent by the M2M server, where the registration response message includes service information.

In S2346, the AP receives an access response message sent by the AAA server, where the access response message includes the service information.

In S2347, the AP sends an association response message to the M2M terminal, where the association response message carries service configuration information that includes the service information.

It should be understood that, the AP may also allocate information such as initial service time and a service duration for the M2M terminal, or negotiate the information with the M2M terminal, and may send the information to the M2M terminal by using the association response message, an air-interface key agreement message, or a resource response message, so that the M2M terminal reports service data in the specified service duration according to the period and the initial service time. For brevity, details are not described herein.

In the embodiment of the present invention, after detecting a network supporting its service, the M2M terminal performs system authentication and an association operation. After completing the association operation with the AP, the M2M terminal performs an EAP authentication process. After the EAP authentication is successful, the AAA server determines, according to subscription information corresponding to the M2M terminal such as a service type of the M2M service and an M2M user identifier, an M2M server to which the M2M terminal reports service data, and register with the M2M server on behalf of the M2M terminal. After the registration succeeds, the M2M server sends the registration response message to the AAA server, where the registration response message includes the service information. After receiving the registration response message, the AAA server sends an EAP success message to the AP, where the EAP success message carries the service information. In this way, the AP may also send the service information to the M2M terminal by using the EAP success message.

It should be understood that, the AP may also allocate information such as the initial service time and the service duration for the M2M terminal, or negotiate the information with the M2M terminal, and may send the information to the M2M terminal by using the EAP success message, the air-interface key agreement message, or the resource response message, so that the M2M terminal reports the service data in the specified service duration according to the period and the initial service time. For brevity, details are not described herein.

Therefore, according to the method for achieving a machine to machine service in the embodiment of the present invention, an AP sends service configuration information to an M2M terminal by using an association response message, an air-interface key agreement message, or an EAP success message, thereby reducing air-interface message interaction between the M2M terminal and the AP, and saving power of the M2M terminal. In addition, the AP allocates service time information for the M2M terminal or the M2M terminal negotiates a data transmission mechanism with the AP, thereby avoiding conflicts occurring when multiple M2M terminals simultaneously report service data. In this way, system operational efficiency can be improved.

In S2400, the AP receives the service data report message that is sent by the M2M terminal according to the service configuration information. Optionally, as shown in S2416 of a method 2410 illustrated in FIG. 13, an AP centralizes service data sent by one or more M2M terminals that correspond to an M2M service, and then sends the service data to an M2M server supporting the M2M service.

Figure 13:
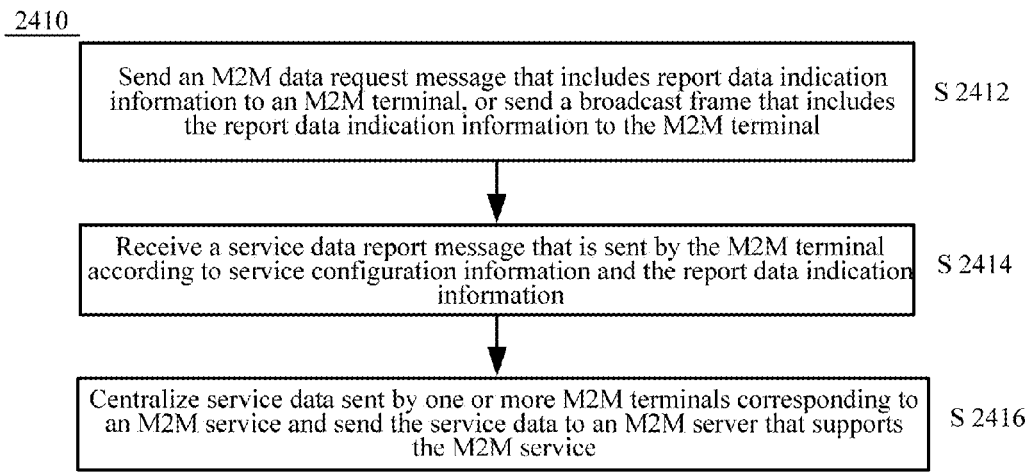
FIG. 13 is a schematic flow chart of a method for receiving a service data report message according to another embodiment of the present invention.

In an embodiment of the present invention, as shown in FIG. 13, before S2416, the method for receiving a service data report message may further include:

S2412. An AP sends an M2M data request message to an M2M terminal, or sends a broadcast frame to the M2M terminal, where the M2M data request message or the broadcast frame includes report data indication information.

The receiving the service data report message that is sent by the M2M terminal according to service configuration information includes:

S2414. The AP receives the service data report message that is sent by the M2M terminal according to the service configuration information and the report data indication information.

Optionally, the service data report message is a MAC-layer message. Optionally, the M2M data request message also is a MAC-layer message. In this way, the M2M terminal is capable of skipping the process of acquiring the IP address of the AP, thereby reducing overhead of an IP packet header each time when data is reported, and improving transmission efficiency.

Specifically, in an initial configuration phase, the M2M terminal acquires the service configuration information that includes a service data report period; and the M2M terminal may also acquire initial service time and a service duration that are allocated by the AP for it or negotiated with the AP. According to the service configuration information, the M2M terminal periodically wakes up at the specified time to prepare for reporting the service data. The M2M terminal sends the service data to the AP by using an M2M data report message. The AP may centralize service data reported by multiple M2M terminals that correspond to the same M2M server, and then send the service data to the M2M server. Certainly, after receiving the service data reported by the M2M terminal, the AP may also directly send the service data to the M2M server. In addition, after acquiring a response of the M2M server, the M2M terminal may further send data report confirmation information to the M2M terminal.

In the embodiment of the present invention, after periodically waking up at the specified time, the M2M terminal waits to receive report data indication information periodically sent by the AP at the specified time. The M2M terminal reports the service data to the AP by using the service data report message only after the M2M terminal receives the report data indication information from the AP. After waking up, if the M2M terminal does not receive the report data indication information from the AP in the specified service duration, the M2M terminal does not need to report the service data.

Therefore, according to the method for achieving a machine to machine service in the embodiment of the present invention, an AP centralizes service data sent by at least one M2M terminal corresponding to the same M2M service, and sends the service data to an M2M server supporting the M2M service, thereby simplifying the data reporting process and improving transmission efficiency of a WiFi network. In addition, the M2M terminal communicates with the AP by using a MAC-layer message and transmits the service data according to service configuration information, thereby reducing system overhead, reducing power consumption, avoiding transmission conflicts, and improving system transmission efficiency.

It should be understood that, the sequence numbers of the above steps do not imply an execution sequence, and the execution sequence of the steps should be determined according to the functions and internal logic, which is not intended to limit the implementation process of the embodiments of the present invention in any way.

With reference to FIG. 2 to FIG. 13, the foregoing describes the method for achieving an M2M service according to the embodiment of the present invention in detail. With reference to FIG. 14 to FIG. 18, the following describes an M2M terminal, an AP, and a system for achieving an M2M service according to embodiments of the present invention in detail.

Figure 14:
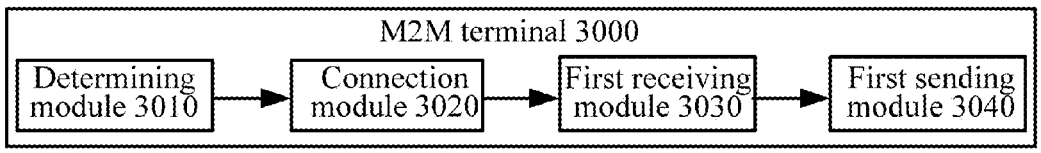
FIG. 14 is a schematic block diagram of an M2M terminal for achieving an M2M service according to an embodiment of the present invention.

FIG. 14 is a schematic block diagram of an M2M terminal 3000 for achieving an M2M service according to an embodiment of the present invention. As shown in FIG. 14, the M2M terminal 3000 includes: a determining module 3010 configured to determine an AP that supports an M2M service; a connection module 3020 configured to establish a communication connection to the AP; a first receiving module 3030 configured to receive service configuration information sent by the AP; and a first sending module 3040 configured to send a service data report message to the AP according to the service configuration information, where the service data report message includes service data corresponding to the M2M service.

According to the M2M terminal for achieving a machine to machine service in the embodiment of the present invention, an M2M terminal first determines an AP that supports the corresponding M2M service, and establishes a communication connection to the AP. In this way, an AP that meets a service requirement of the M2M terminal can be quickly detected, and it is avoided that the M2M terminal can detect the AP that supports the corresponding service only after multiple attempts to access a WiFi network are performed and authentication is successful, thereby improving network discovery efficiency, reducing power consumption of the M2M terminal in a network discovery phase, and reducing system signaling overhead.

It should be understood that the M2M service described in the foregoing is an M2M service supported by the M2M terminal by default. Unless otherwise specified, in other embodiments of the present invention, the M2M service is an M2M service supported by the M2M terminal by default. For brevity, this will not be described repeatedly in the following.

Optionally, the determining module 3010 is further configured to, according to a first service identifier that corresponds to the M2M service supported by the M2M terminal and a second service identifier that corresponds to an M2M service supported by the AP, determine the AP that supports the M2M service. The first service identifier includes at least one among an M2M user identifier, an M2M server identifier, an M2M terminal identifier, and a service type that correspond to the M2M service supported by the M2M terminal; and the second service identifier includes at least one among an M2M user identifier, an M2M server identifier, an M2M terminal identifier, and a service type that correspond to the M2M service supported by the AP.

Figure 15A:
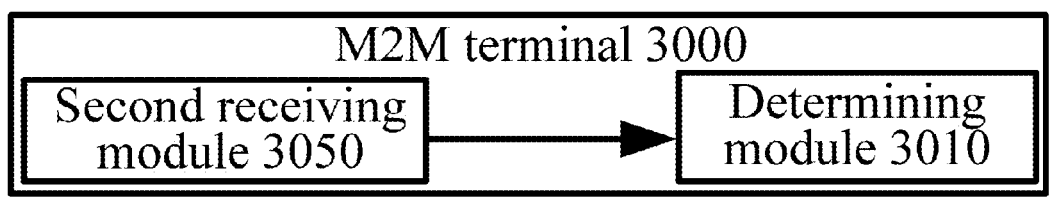
FIG. 15A to FIG. 15D are schematic block diagrams of an M2M terminal for achieving an M2M service according to another embodiment of the present invention.

In an embodiment of the present invention, optionally, as shown in FIG. 15A, the M2M terminal 3000 further includes: a second receiving module 3050 configured to receive a broadcast frame sent by the AP, where the broadcast frame carries the second service identifier that corresponds to the M2M service supported by the AP.

The determining module 3010 is specifically configured to: when the first service identifier matches the second service identifier, determine that the AP supports the M2M service.

Therefore, by receiving a beacon frame periodically sent by the AP and according to whether the second service identifier that corresponds to the M2M service supported by the AP and is carried in the beacon frame matches the first service identifier, the M2M terminal is capable of quickly determining the AP meeting its service requirement, thereby improving network discovery efficiency, reducing power consumption, and reducing system signaling overhead.

Figure 15B:
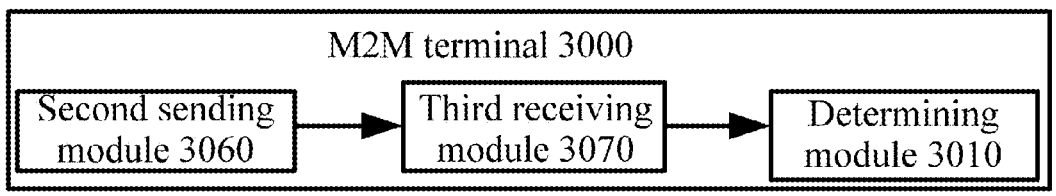

Optionally, as shown in FIG. 15B, the M2M terminal 3000 further includes: a second sending module 3060 configured to send a probe request message to the AP, where the probe request message includes the first service identifier that corresponds to the M2M service supported by the M2M terminal; and a third receiving module 3070 configured to receive a probe response message sent by the AP in response to the probe request message, where the probe response message includes the second service identifier that corresponds to the M2M service supported by the AP.

The determining module 3010 is specifically configured to: when the first service identifier matches the second service identifier, determine that the AP supports the M2M service.

Optionally, the second service identifier includes at least one among an M2M user identifier, an M2M server identifier, an M2M terminal identifier, and a service type that correspond to the M2M service supported by the AP. The M2M server identifier may be the IP address, the URL address, or the like of an M2M server supporting the M2M service; and the M2M terminal identifier may be the MAC address, the IP address, or the like of the M2M terminal.

Therefore, by receiving the probe response message sent by the AP and according to whether the second service identifier included in the probe response message matches the first service identifier, the M2M terminal is capable of quickly determining the AP meeting its service requirement, thereby improving network discovery efficiency, reducing power consumption, and reducing system signaling overhead.

It should be understood that, in the embodiment of the present invention, whether the first service identifier matches the second service identifier may be determined by determining whether the first service identifier is the same as the second service identifier or whether the first service identifier corresponds to the second service identifier.

It should be understood that, in an embodiment of the present invention, if the M2M server identifier of an M2M server supporting the M2M service is preset in the M2M terminal, the M2M terminal may determine, according to the M2M server identifier, or according to at least one among the M2M server identifier, the M2M user identifier, the M2M terminal identifier, and the service type, the AP that supports the M2M service. In this case, service configuration information sent by the AP and received by the M2M terminal may exclude the M2M server identifier. Certainly, the service configuration information may also include the M2M server identifier. However, a service data report message sent by the M2M terminal to the AP needs to include the M2M server identifier, so that the AP is capable of sending service data of the M2M terminal to the corresponding M2M server.

Likewise, in an embodiment of the present invention, if the M2M server identifier is not preset in the M2M terminal, the M2M terminal may determine the AP that supports the M2M service according to at least one among the M2M user identifier, the M2M terminal identifier, and the service type in the first service identifier. In this case, the service configuration information sent by the AP and received by the M2M terminal needs to include the M2M server identifier. Because the AP learns the M2M server identifier corresponding to the M2M terminal, the service data report message sent by the M2M terminal to the AP does not need to include the M2M server identifier. Certainly, the service data report message may also include the M2M server identifier.

It should further be understood that when an M2M user is provisioning an M2M service, at least one among an M2M user identifier, an M2M terminal identifier, and a service type that correspond to the M2M service is preset in the M2M terminal; in another aspect, a WiFi network provider configures, in the AP according to service information of a subscribed M2M service, at least one among an M2M user identifier, an M2M terminal identifier, and a service type that correspond to an M2M service supported by the network.

In an embodiment of the present invention, optionally, the first receiving module 3030 is specifically configured to receive an association response message, an air-interface key agreement message, or an EAP success message sent by the AP, where the association response message, the air-interface key agreement message, or the EAP success message includes the service configuration information.

Optionally, the service configuration information includes the M2M server identifier. Optionally, the service configuration information includes a service data sending period. Optionally, the service configuration information includes the service data sending period, initial service time, and a service duration.

Figure 15C:
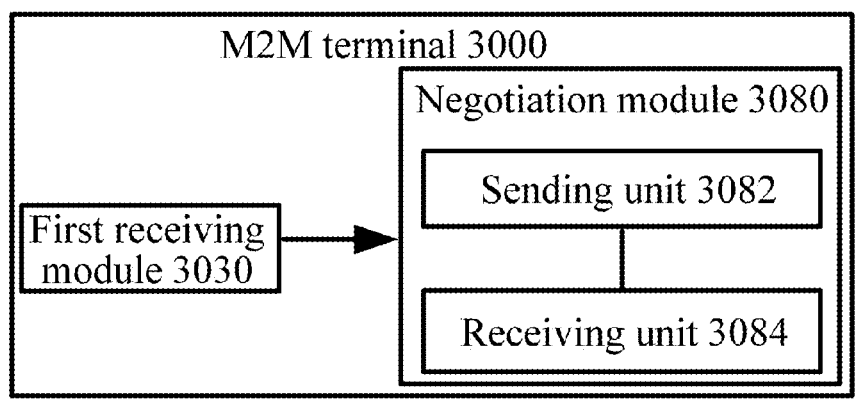

Optionally, as shown in FIG. 15C, the M2M terminal 3000 further includes: a negotiation module 3080 configured to negotiate a data transmission mechanism with the AP according to the service configuration information.

The first sending module 3040 is specifically configured to send a service data report message to the AP according to the service configuration information and the result of the negotiation between the negotiation module 3080 and the AP about the data transmission mechanism.

Optionally, the service data report message further includes the M2M server identifier.

Optionally, the negotiation module 3080 includes: a sending unit 3082 configured to send a resource request message to the AP, where the resource request message includes the initial service time and the service duration that are determined by the M2M terminal according to the service configuration information; and a receiving unit 3084 configured to receive a resource response message sent by the AP in response to the resource request message, where the resource response message includes the initial service time and the service duration that are allocated by the AP for the M2M terminal according to the service configuration information.

Therefore, according to the M2M terminal for achieving a machine to machine service in the embodiment of the present invention, an AP sends service configuration information to an M2M terminal by using an association response message, an air-interface key agreement message, or an EAP success message, thereby reducing air-interface message interaction between the M2M terminal and the AP, and saving power of the M2M terminal. In addition, the AP allocates service time information for the M2M terminal or the M2M terminal negotiates a data transmission mechanism with the AP, thereby avoiding conflicts occurring when multiple M2M terminals simultaneously report service data. In this way, system operational efficiency can be improved.

Figure 15D:
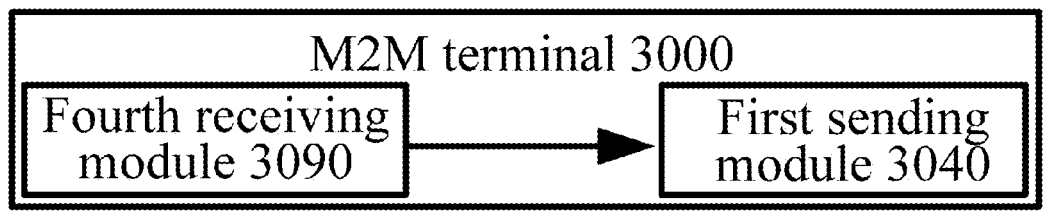

In an embodiment of the present invention, optionally, as shown in FIG. 15D, the M2M terminal 3000 further includes: a fourth receiving module 3090 configured to receive an M2M data request message sent by the AP or receive a broadcast frame sent by the AP, where the M2M data request message or the broadcast frame includes report data indication information.

The first sending module 3040 is specifically configured to send a service data report message to the AP according to the service configuration information and the report data indication information in the M2M data request message or the broadcast frame.

Optionally, the service data report message is a MAC-layer message. Optionally, the M2M data request message is a MAC-layer message.

Therefore, according to an M2M apparatus for achieving a machine to machine service in the embodiment of the present invention, an AP centralizes service data sent by at least one M2M terminal corresponding to the same M2M service, and sends the service data to an M2M server supporting the M2M service, thereby simplifying the data reporting process and improving transmission efficiency of a WiFi network. In addition, the M2M terminal communicates with the AP by using a MAC-layer message and transmits the service data according to service configuration information, thereby reducing system overhead, reducing power consumption, avoiding transmission conflicts, and improving system transmission efficiency.

The foregoing and other operations and/or functions of each of the modules in the M2M terminal according to the embodiment of the present invention are intended for implementing the corresponding processes of each of the methods in FIG. 2 to FIG. 6. For brevity, details are not described herein.

Figure 16:
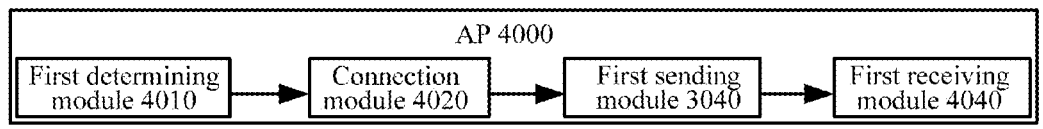
FIG. 16 is a schematic block diagram of an AP for achieving an M2M service according to an embodiment of the present invention.

FIG. 16 is a schematic block diagram of an AP 4000 for achieving an M2M service according to an embodiment of the present invention. As shown in FIG. 16, the AP 4000 includes: a first determining module 4010 configured to determine that a wireless AP supports a M2M service; a connection module 4020 configured to establish a communication connection to an M2M terminal that supports the M2M service; a first sending module 4030 configured to send service configuration information to the M2M terminal; and a first receiving module 4040 configured to receive a service data report message that is sent by the M2M terminal according to the service configuration information, where the service data report message includes service data corresponding to the M2M service.

The AP for achieving a machine to machine service in the embodiment of the present invention determines that it supports the corresponding M2M service, and establishes a communication connection to an M2M terminal supporting the M2M service. In this way, an AP that meets a service requirement of the M2M terminal can be quickly detected, and it is avoided that the M2M terminal can detect the AP that supports the corresponding service only after multiple attempts to access a WiFi network are performed and authentication is successful, thereby improving network discovery efficiency, reducing power consumption of the M2M terminal in a network discovery phase, and reducing system signaling overhead.

Optionally, the first determining module 4010 is further configured to, according to a first service identifier that corresponds to an M2M service supported by the M2M terminal and a second service identifier that corresponds to an M2M service supported by the AP, determine that the AP supports the M2M service.

Optionally, the first service identifier includes at least one among an M2M user identifier, an M2M server identifier, an M2M terminal identifier, and a service type that correspond to the M2M service supported by the M2M terminal; and the second service identifier includes at least one among an M2M user identifier, an M2M server identifier, an M2M terminal identifier, and a service type that correspond to the M2M service supported by the AP. The M2M server identifier may be the IP address, the URL address, or the like of an M2M server supporting the M2M service; and the M2M terminal identifier may be the MAC address, the IP address, or the like of the M2M terminal.

Figure 17A:
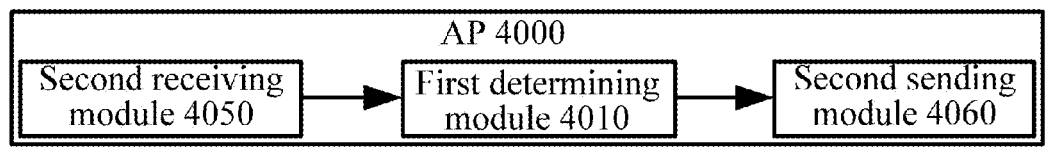
FIG. 17A to FIG. 17F are schematic block diagrams of an AP for achieving an M2M service according to another embodiment of the present invention.

In an embodiment of the present invention, optionally, as shown in FIG. 17A, the AP 4000 further includes: a second receiving module 4050 configured to receive a probe request message sent by the M2M terminal, where the probe request message includes the first service identifier that corresponds to the M2M service supported by the M2M terminal.

The first determining module 4010 is specifically configured to: when the second service identifier matches the first service identifier, determine that the AP supports the M2M service, where the second service identifier is a service identifier that corresponds to the M2M service supported by the AP.

The AP further includes: a second sending module 4060 configured to send a probe response message to the M2M terminal after the first determining module determines that the AP supports the M2M service, where the probe response message includes the second service identifier.

Optionally, the second service identifier includes at least one among an M2M user identifier, an M2M server identifier, an M2M terminal identifier, and a service type that correspond to the M2M service supported by the AP.

Therefore, according to whether the first service identifier matches the second service identifier, the AP is capable of quickly determining whether it supports the M2M service, thereby improving network discovery efficiency, reducing power consumption, and reducing system signaling overhead.

In an embodiment of the present invention, optionally, the first sending module 4030 is specifically configured to send an association response message, an air-interface key agreement message, or an EAP success message to the M2M terminal, where the association response message, the air-interface key agreement message, or the EAP success message includes the service configuration information.

Optionally, the service configuration information or the service data report message includes the M2M server identifier corresponding to the M2M service.

Figure 17B:
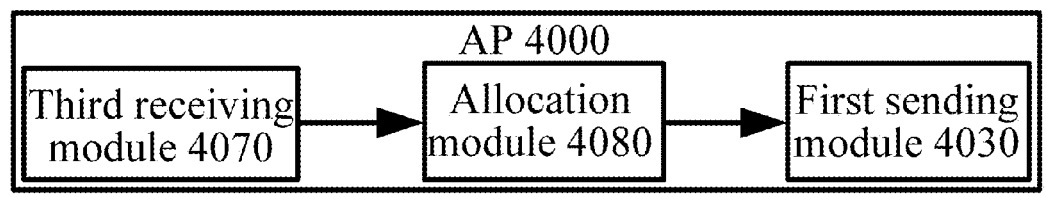

Optionally, as shown in FIG. 17B, the AP 4000 further includes: a third receiving module 4070 configured to receive service information from the M2M server supporting the M2M service.

The first sending module 4030 is specifically configured to send the association response message, the air-interface key agreement message, or the EAP success message to the M2M terminal, where the association response message, the air-interface key agreement message, or the EAP success message includes the service configuration information, and the service configuration information includes the service information.

Therefore, by using a message during extensible association or EAP authentication, the AP delivers the service configuration information to the M2M terminal, thereby reducing air-interface message interaction between the AP and the M2M terminal, reducing power consumption of the M2M terminal, and improving system efficiency.

Optionally, the service information includes a service data sending period.

In an embodiment of the present invention, optionally, as shown in FIG. 17B, the AP 4000 further includes: an allocation module 4080 configured to allocate initial service time and a service duration for the M2M terminal according to the service information.

The first sending module 4030 is specifically configured to send the service configuration information to the M2M terminal, where the service configuration information includes the service information, the initial service time, and the service duration.

Figure 17C:
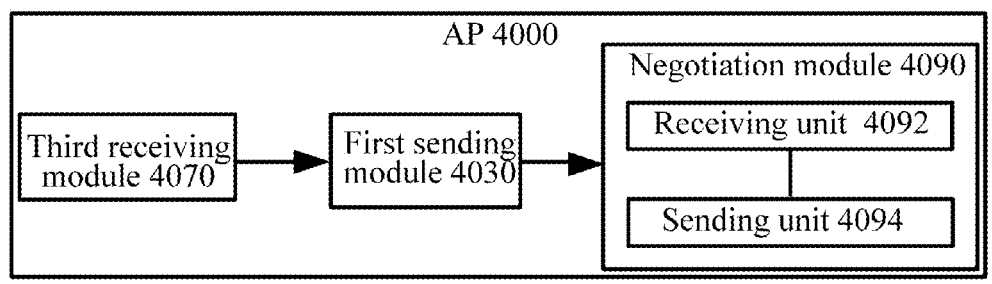

Optionally, as shown in FIG. 17C, the AP 4000 further includes: a negotiation module 4090 configured to negotiate a data transmission mechanism with the M2M terminal according to the service information.

The first receiving module 4040 is specifically configured to receive the service data report message that is sent by the M2M terminal according to the service configuration information, and the result of the negotiation between the negotiation module 4090 and the M2M terminal about the data transmission mechanism.

Optionally, as shown in FIG. 17C, the negotiation module 4090 includes: a receiving unit 4092 configured to receive a resource request message sent by the M2M terminal, where the resource request message includes the initial service time and the service duration that are determined by the M2M terminal according to the service information; and a sending unit 4094 configured to send a resource response message to the M2M terminal, where the resource response message includes the initial service time and the service duration that are allocated by the AP for the M2M terminal according to the resource request message and the service information.

Therefore, the AP for achieving a machine to machine service in the embodiment of the present invention sends service configuration information to an M2M terminal by using an association response message, an air-interface key agreement message, or an EAP success message, thereby reducing air-interface message interaction between the M2M terminal and the AP, and saving power of the M2M terminal. In addition, the AP allocates service time information for the M2M terminal or the M2M terminal negotiates a data transmission mechanism with the AP, thereby avoiding conflicts occurring when multiple M2M terminals simultaneously report service data. In this way, system operational efficiency can be improved.

Figure 17D:
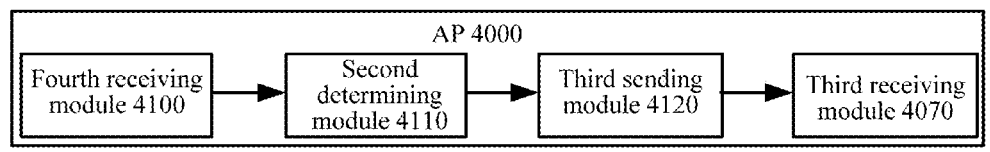

In an embodiment of the present invention, optionally, as shown in FIG. 17D, the AP 4000 further includes: a fourth receiving module 4100 configured to receive an association request message sent by the M2M terminal, where the association request message includes the first service identifier that corresponds to the M2M service supported by the M2M terminal, and registration request indication information; a second determining module 4110 configured to determine, according to the first service identifier, the M2M server supporting the M2M service; and a third sending module 4120 configured to, according to the registration request indication information, send a registration request message to the M2M server, where the registration request message includes the M2M terminal identifier.

The third receiving module 4070 is specifically configured to receive a registration response message sent by the M2M server, where the registration response message includes the service information. Optionally, the service information includes the service data sending period.

Figure 17E:
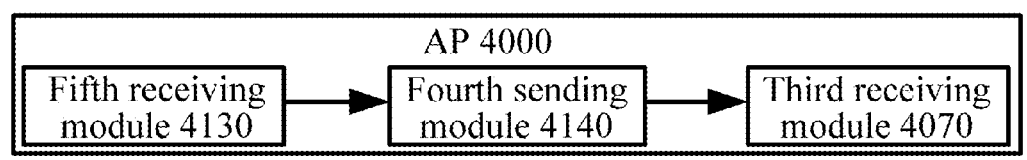

Optionally, as shown in FIG. 17E, the AP 4000 further includes: a fifth receiving module 4130 configured to receive the association request message sent by the M2M terminal, where the association request message includes the first service identifier that corresponds to the M2M service supported by the M2M terminal, and the registration request indication information; and a fourth sending module 4140 configured to send an access request message to an AAA server according to the registration request indication information, where the access request message includes the first service identifier and the registration request indication information. In this way, the AAA server sends, according to the registration request indication information, the registration request message to the M2M server determined by using the first service identifier, where the registration request message includes the M2M terminal identifier.

The third receiving module 4070 is specifically configured to receive an access response message sent by the AAA server, where the access response message includes the service information sent by the M2M server to the AAA server by using the registration response message.

Optionally, the third receiving module 4070 is further specifically configured to: when the EAP authentication performed on M2M terminal by the AAA server is successful, receive an EAP success message sent by the AAA server, where the EAP success message includes the service information sent by the M2M server to the AAA server by using the registration response message.

Therefore, the AP for achieving a machine to machine service in the embodiment of the present invention sends service configuration information to an M2M terminal by using an association response message, an air-interface key agreement message, or an EAP success message, thereby reducing air-interface message interaction between the M2M terminal and the AP, and saving power of the M2M terminal. In addition, the AP allocates service time information for the M2M terminal or the M2M terminal negotiates a data transmission mechanism with the AP, thereby avoiding conflicts occurring when multiple M2M terminals simultaneously report service data. In this way, system operational efficiency can be improved.

Figure 17F:
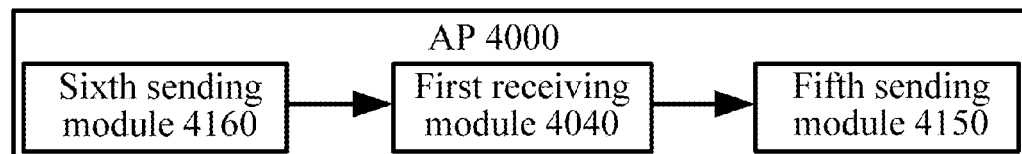

In an embodiment of the present invention, optionally, as shown in FIG. 17F, the AP 4000 further includes: a fifth sending module 4150 configured to centralize service data sent by one or more M2M terminals that correspond to the M2M service, and then send the service data to the M2M server supporting the M2M service.

Optionally, as shown in FIG. 17F, the AP 4000 further includes: a sixth sending module 4160 configured to send an M2M data request message to the M2M terminal, or send a broadcast frame to the M2M terminal, where the M2M data request message or the broadcast frame includes report data indication information.

The first receiving module 4040 is specifically configured to receive the service data report message that is sent according to the service configuration information and the report data indication information.

Optionally, the service data report message is a MAC-layer message. Optionally, the M2M data request message is a MAC-layer message.

Therefore, the AP for achieving a machine to machine service in the embodiment of the present invention centralizes service data sent by at least one M2M terminal corresponding to the same M2M service, and sends the service data to an M2M server supporting the M2M service, thereby simplifying the data reporting process and improving transmission efficiency of a WiFi network. In addition, the M2M terminal communicates with the AP by using a MAC-layer message and transmits the service data according to service configuration information, thereby reducing system overhead, reducing power consumption, avoiding transmission conflicts, and improving system transmission efficiency.

The foregoing and other operations and/or functions of each of the modules in the AP according to the embodiment of the present invention are intended for implementing the corresponding processes of each of the methods in FIG. 7 to FIG. 13. For brevity, details are not described herein.

Figure 18:
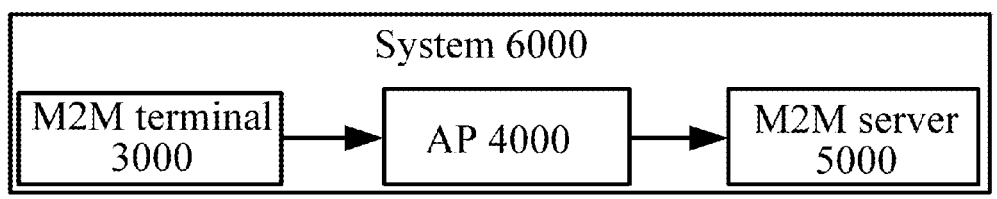
FIG. 18 is a schematic block diagram of a system for achieving an M2M service according to an embodiment of the present invention.

FIG. 18 is a schematic block diagram of a system 6000 for achieving an M2M service according to an embodiment of the present invention. As shown in FIG. 18, the system 6000 includes: the M2M terminal 3000 according to the embodiment of the present invention, including: a first determining module configured to determine an AP that supports an M2M service; a first connection module configured to establish a communication connection to the AP; a first receiving module configured to receive service configuration information sent by the AP; and a first sending module configured to send a service data report message to the AP according to the service configuration information, where the service data report message includes service data corresponding to the M2M service.

The AP 4000 according to the embodiment of the present invention, including: a second determining module configured to determine that the AP supports the M2M service; a second connection module configured to establish the communication connection to the M2M terminal supporting the M2M service; a second sending module configured to send the service configuration information to the M2M terminal; and a second receiving module configured to receive the service data report message that is sent by the M2M terminal according to the service configuration information, where the service data report message includes the service data corresponding to the M2M service; and an M2M server 5000 that supports the M2M service.

Optionally, the M2M server 5000 is configured to receive a registration request message sent by the AP 4000. Optionally, the M2M server 5000 is configured to send service information to the AP by sending a registration response message, where the service information includes a service data sending period.

The M2M terminal and AP included in the system for achieving an M2M service according to the embodiment of the present invention may correspond to the M2M terminal 3000 and the AP 4000 in the embodiment of the present invention. In addition, the foregoing and other operations and/or functions of each of the modules of the M2M terminal 3000 are intended for implementing the corresponding processes of each of the methods in FIG. 2 to FIG. 6; and the foregoing and other operations and/or functions of each of the modules of the AP 4000 are intended for implementing the corresponding processes of each of the methods in FIG. 7 to FIG. 13. For brevity, details are not described herein.

The system for achieving a machine to machine service according to the embodiment of the present invention is capable of effectively achieving an M2M service in a WiFi network, thereby reducing power consumption, reducing system signaling overhead, and improving system efficiency.

Persons of ordinary skill in the art should appreciate that, in combination with the examples described in the embodiments herein, units and algorithm steps can be implemented by electronic hardware, computer software, or a combination thereof. To clearly describe the interchangeability between the hardware and the software, the foregoing has generally described compositions and steps of every embodiment according to functions. Whether the functions are executed by hardware or software depends on the particular applications and design constraint conditions of the technical solutions. Persons skilled in the art can use different methods to implement the described functions for each particular application, but it should not be considered that the implementation goes beyond the scope of the present invention.

It can be clearly understood by persons skilled in the art that, for the purpose of convenient and brief description, for a detailed working process of the foregoing system, apparatus and unit, reference may be made to the corresponding process in the method embodiments, and the details will not be described herein again.

In the embodiments provided in the present application, it should be understood that the disclosed system, apparatus, and method may be implemented in other modes. For example, the described apparatus embodiments are merely exemplary. For example, the unit division is merely logical function division and can be other division in actual implementation. For example, multiple units or components can be combined or integrated into another system, or some features can be ignored or not performed. In addition, the displayed or discussed mutual couplings or direct couplings or communication connections are implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network elements. A part or all of the units herein may be selected according to the actual needs to achieve the objectives of the solutions of the embodiments of the present invention.

In addition, functional units in the embodiments of the present invention may be integrated into a processing unit, or each of the units may exist alone physically, or two or more units may be integrated into a unit. The integrated unit may be implemented in a form of hardware, or may be implemented in a form of a software functional unit.

When being implemented in the form of a software functional unit and sold or used as a separate product, the integrated unit may be stored in a computer-readable storage medium. Based on such understanding, the technical solutions of the present invention essentially, or the part contributing to the prior art, or all or a part of the technical solutions may be implemented in a form of software product. The computer software product is stored in a storage medium and includes several instructions for instructing a computer device (which may be a personal computer, a server, a network device, and the like) to execute all or a part of steps of the method described in the embodiments of the present invention. The storage medium includes: any medium that can store program codes, such as a U-disk, a removable hard disk, a read-only memory (ROM), a random access memory (RAM), a magnetic disk, or a compact disc read-only memory (CD-ROM).

The foregoing descriptions are merely exemplary embodiments of the present invention, but not intended to limit the protection scope of the present invention. Any equivalent modification or replacement that can be easily made by persons skilled in the art without departing from the technical scope disclosed by the present invention shall fall within the protection scope of the present invention. Therefore, the protection scope of the present invention shall be subject to the protection scope of the appended claims.

What is claimed is:

1. A method for achieving a machine to machine (M2M) service, comprising:
   determining a wireless access point (AP) that supports the M2M service by determining that a first service identifier that corresponds to the M2M service supported by an M2M terminal matches a second service identifier that corresponds to the M2M service supported by the AP when the second service identifier is received from the AP in a broadcast frame;
   determining the AP that supports the M2M service by determining that the first service identifier matches the second service identifier when the second service identifier is received from the AP in response to a probe request message;
   establishing a communication connection to the AP when the AP supports the M2M service;
   receiving service configuration information sent by the AP; and
   sending a service data report message to the AP according to the service configuration information,
   wherein the service data report message comprises service data corresponding to the M2M service,
   wherein after receiving the service configuration information sent by the AP, the method further comprises negotiating a data transmission mechanism with the AP according to the service configuration information, and
   wherein sending the service data report message to the AP according to the service configuration information comprises sending the service data report message to the AP according to the service configuration information and the result of the negotiation with the AP about the data transmission mechanism.

2. The method according to claim 1, wherein negotiating the data transmission mechanism with the AP according to the service configuration information comprises:
   sending a resource request message to the AP, wherein the resource request message comprises initial service time and a service duration that are determined by the M2M terminal according to the service information in the service configuration information; and
   receiving a resource response message sent by the AP in response to the resource request message, wherein the resource response message comprises initial service time and a service duration that are allocated by the AP for the M2M terminal according to the service information and the resource request message.

3. A method for achieving a machine to machine (M2M) service, comprising:
- determining a wireless access point (AP) that supports the M2M service when the AP transmits a second service identifier that corresponds to the M2M service supported by the AP to an M2M terminal as a part of a broadcast frame and the second service identifier matches a first service identifier on the M2M terminal that corresponds to the M2M service supported by the M2M terminal;
- determining the AP that supports the M2M service when the AP receives a probe request message comprising the first service identifier from the M2M terminal that matches the second service identifier;
- establishing a communication connection to the M2M terminal that supports the M2M service;
- sending service configuration information to the M2M terminal;
- receiving a service data report message that is sent by the M2M terminal according to the service configuration information, wherein the service data report message comprises service data corresponding to the M2M service; and
- receiving service information from an M2M server that supports the M2M service,
- wherein the service configuration information sent to the M2M terminal comprises the service information,
- wherein after sending the service configuration information to the M2M terminal, the method further comprises negotiating a data transmission mechanism with the M2M terminal according to the service information, and
- wherein receiving the service data report message that is sent by the M2M terminal according to the service configuration information comprises receiving the service data report message that is sent by the M2M terminal according to the service configuration information and the result of the negotiation with the M2M terminal about the data transmission mechanism.

4. The method according to claim 3, wherein negotiating the data transmission mechanism with the M2M terminal according to the service information comprises:
- receiving a resource request message sent by the M2M terminal, wherein the resource request message comprises initial service time and a service duration that are determined by the M2M terminal according to the service information; and
- sending a resource response message to the M2M terminal, wherein the resource response message comprises initial service time and a service duration that are allocated by the AP for the M2M terminal according to the resource request message and the service information such that the M2M terminal sends the service data report message according to the service information, the initial service time, and the service duration.

5. A method for achieving a machine to machine (M2M) service, comprising:
- determining a wireless access point (AP) that supports the M2M service when the AP transmits a second service identifier that corresponds to the M2M service supported by the AP to an M2M terminal as a part of a broadcast frame and the second service identifier matches a first service identifier on the M2M terminal that corresponds to the M2M service supported by the M2M terminal;
- determining the AP that supports the M2M service when the AP receives a probe request message comprising the first service identifier from the M2M terminal that matches the second service identifier;
- establishing a communication connection to the M2M terminal that supports the M2M service;
- sending service configuration information to the M2M terminal;
- receiving a service data report message that is sent by the M2M terminal according to the service configuration information, wherein the service data report message comprises service data corresponding to the M2M service;
- receiving service information from an M2M server that supports the M2M service, wherein the service configuration information sent to the M2M terminal comprises the service information;
- receiving an association request message sent by the M2M terminal, wherein the association request message comprises the first service identifier that corresponds to the M2M service supported by the M2M terminal, and registration request indication information;
- determining, according to the first service identifier, the M2M server that supports the M2M service; and
- sending a registration request message to the M2M server according to the registration request indication information,
- wherein the registration request message comprises the M2M terminal identifier,
- wherein receiving the service information from the M2M server that supports the M2M service comprises receiving a registration response message sent by the M2M server, and
- wherein the registration response message comprises the service information.

6. A method for achieving a machine to machine (M2M) service, comprising:
- determining a wireless access point (AP) that supports the M2M service when the AP transmits a second service identifier that corresponds to the M2M service supported by the AP to an M2M terminal as a part of a broadcast frame and the second service identifier matches a first service identifier on the M2M terminal that corresponds to the M2M service supported by the M2M terminal;
- determining the AP that supports the M2M service when the AP receives a probe request message comprising the first service identifier from the M2M terminal that aches the second service identifier;
- establishing a communication connection to the M2M terminal that supports the M2M service;
- sending service configuration information to the M2M terminal;
- receiving a service data report message that is sent by the M2M terminal according to the service configuration information, wherein the service data report message comprises service data corresponding to the M2M service;
- receiving service information from an M2M server that supports the M2M service, wherein the service configuration information sent to the M2M terminal comprises the service information;
- receiving an association request message sent by the M2M terminal, wherein the association request message comprises the first service identifier that corresponds to the M2M service supported by the M2M terminal, and registration request indication information; and sending an access request message to an authentication, authorization, and accounting (AAA) server according to the registration request indication information, wherein the access request message comprises the first service identifier and the registration request indication information such that the AAA server sends a registration request message according to the registration request indication information to the M2M server that is determined according to the first service identifier, wherein the registration request message comprises the M2M terminal identifier, wherein receiving the service information from the M2M server that supports the service comprises receiving an access response message sent by the AAA server, and wherein the access response message comprises the service information sent by the M2M server to the AAA server by using a registration response message.

7. A machine to machine terminal for achieving an M2M service, comprising:
a computer processor configured to:
determine a wireless access point (AP) that supports the M2M service by determining that a first service identifier that corresponds to the M2M service supported by an M2M terminal matches a second service identifier that corresponds to the M2M service supported by the AP when the second service identifier is received from the AP in a broadcast frame;
determine the AP that supports the M2M service by determining that the first service identifier matches the second service identifier when the second service identifier is received from the AP in response to a probe request message;
establish a communication connection to the AP;
receive service configuration information sent by the AP;
send a service data report message to the AP according to the service configuration information, wherein the service data report message comprises service data corresponding to the M2M service;
negotiate a data transmission mechanism with the AP according to the service configuration information; and
send a service data report message to the AP according to the service configuration information and the result of the negotiation with the AP about the data transmission mechanism.

8. The M2M terminal according to claim 7, wherein the computer processor is further configured to:
send a resource request message to the AP, wherein the resource request message comprises initial service time and a service duration that are determined by the M2M terminal according to the service configuration information; and
receive a resource response message sent by the AP in response to the resource request message, wherein the resource response message comprises initial service time and a service duration that are allocated by the AP for the M2M terminal according to the service configuration information.

9. A wireless access point (AP) for achieving a machine to machine (M2M) service, comprising:
a computer processor configured to:
determine that the AP supports the M2M service when the AP transmits a second service identifier that corresponds to the M2M service supported by the AP to an M2M terminal as a part of a broadcast frame and the second service identifier matches a first service identifier on the M2M terminal that corresponds to the M2M service supported by the M2M terminal;
determine the AP that supports the M2M service when the AP receives a probe request message comprising the first service identifier from the M2M terminal that matches the second service identifier;
establish a communication connection to an M2M terminal that supports the M2M service;
send service configuration information to the M2M terminal;
receive a service data report message that is sent by the M2M terminal according to the service configuration information, wherein the service data report message comprises service data corresponding to the M2M service;
receive service information from an M2M server that supports the M2M service, wherein the service configuration information sent to the M2M terminal comprises the service information;
negotiate a data transmission mechanism with the M2M terminal according to the service information; and
receive a service data report message that is sent by the M2M terminal according to the service configuration information and the result of the negotiation with the M2M terminal about the data transmission mechanism.

10. The AP according to claim 9, wherein the computer processor is further configured to:
receive a resource request message sent by the M2M terminal, wherein the resource request message comprises initial service time and a service duration that are determined by the M2M terminal according to the service information; and
send a resource response message to the M2M terminal, wherein the resource response message comprises initial service time and a service duration that are allocated by the AP for the M2M terminal according to the resource request message and the service information.

11. A wireless access point (AP) for achieving a machine to machine (M2M) service, comprising:
a computer processor configured to:
determine that the AP supports the M2M service when the AP transmits a second service identifier that corresponds to the M2M service supported by the AP to an M2M terminal as a part of a broadcast frame and the second service identifies identifier matches a first service identifier on the M2M terminal that corresponds to the M2M service supported by the M2M terminal;
determine AP that supports the M2M service when the AP receives a probe request message comprising the first service identifier from the M2M terminal that matches the second service identifier;
establish a communication connection to an M2M terminal that supports the M2M service;
send service configuration information to the M2M terminal;
receive a service data report message that is sent by the M2M terminal according to the service configuration information, wherein the service data report message comprises service data corresponding to the M2M service;
receive service information from an M2M server that supports the M2M service wherein the service configuration information sent to the M2M terminal comprises the service information;
receive an association request message sent by the M2M terminal, wherein the association request message comprises the first service identifier that corresponds to the M2M service supported by the M2M terminal, and registration request indication information;
determine the M2M server that supports the M2M service according to the first service identifier;
send a registration request message sage to the M2M server according to the registration request indication information, wherein the registration request message comprises an M2M terminal identifier; and
receive a registration response message sent by the M2M server, wherein the registration response message comprises the service information.

12. A wireless access point (AP) for achieving a machine to machine (M2M) service, comprising:
a computer processor configured to:
determine that the AP supports the M2M service when the AP transmits a second service identifier that corresponds to the M2M service supported by the AP to an M2M terminal as a part of a broadcast frame and the second service identifier matches a first service identifier on the M2M terminal that corresponds to the M2M service supported by the M2M terminal;
determine the AP that supports the M2M service when the AP receives a probe request message comprising the first service identifier from the M2M terminal that matches the second service identifier;
establish a communication connection to an M2M terminal that supports the M2M service;
send service configuration information to the M2M terminal;
receive a service data report message that is sent by the M2M terminal according to the service configuration information, wherein the service data report message comprises service data corresponding to the M2M service;
receive service information from an M2M server that supports the M2M service, wherein the service configuration information sent to the M2M terminal comprises the service information;
receive an association request message sent by the M2M terminal, wherein the association request message comprises the first service identifier that corresponds to the M2M service supported by the M2M terminal, and the registration request indication information;
send an access request message to an authentication, authorization, and accounting (AAA) server according to the registration request indication information, wherein the access request message comprises the first service identifier and the registration request indication information such that the AAA server sends a registration request message according to the registration request indication information to the M2M server that is determined according to the first service identifier, wherein the registration request message comprises the M2M terminal identifier; and
receive an access response message sent by the AAA server, wherein the access response message comprises the service information sent by the M2M server to the AAA server by using the registration response message.

13. A wireless access point (AP) for achieving a machine to machine (M2M) service, comprising:
a computer processor configured to:
determine that the AP supports the M2M service when the AP transmits a second service identifier that corresponds to the M2M service supported by the AP to an M2M terminal as a part of a broadcast frame and the second service identifier matches a first service identifier on the M2M terminal that corresponds to the M2M service supported by the M2M terminal;
determining the AP that supports the M2M service then the AP receives a probe request message comprising the first service identifier from the M2M terminal that matches the second service identifier;
establish a communication connection to an M2M terminal that supports the M2M service;
send service configuration information to the M2M terminal;
receive a service data report message that is sent by the M2M terminal according to the service configuration information, wherein the service data report message comprises service data corresponding, to the M2M service;
centralize service data sent by one or more M2M terminals corresponding to the M2M service;
send the service data to the M2M server that supports the M2M service; and
send an M2M data request message to the M2M terminal or send a broadcast frame to the M2M terminal,
wherein the M2M data request message or the broadcast frame comprises report data indication information, and
wherein the first receiving module is configured to receive the service data report message that is sent by the M2M terminal according to the service configuration information and the report data indication information.

* * * * *

UNITED STATES PATENT AND TRADEMARK OFFICE
CERTIFICATE OF CORRECTION

PATENT NO.        : 9,451,387 B2
APPLICATION NO.   : 14/145164
DATED             : September 20, 2016
INVENTOR(S)       : Guiming Shu et al.

It is certified that error appears in the above-identified patent and that said Letters Patent is hereby corrected as shown below:

In the Claims

Column 30, Line 47, Column 31, Line 12, Claim 6 should read:

A method for achieving a machine to machine (M2M) service, comprising:
determining a wireless access point (AP) that supports the M2M service when the AP transmits a second service identifier that corresponds to the M2M service supported by the AP to an M2M terminal as a part of a broadcast frame and the second service identifier matches a first service identifier on the M2M terminal that corresponds to the M2M service supported by the M2M terminal; determining the AP that supports the M2M service when the AP receives a probe request message comprising the first service identifier from the M2M terminal that matches the second service identifier;
establishing a communication connection to the M2M terminal that supports the M2M service; sending service configuration information to the M2M terminal;
receiving a service data report message that is sent by the M2M terminal according to the service configuration information, wherein the service data report message comprises service data corresponding to the M2M service;
receiving service information from an M2M server that supports the M2M service, wherein the service configuration information sent to the M2M terminal comprises the service information;
receiving an association request message sent by the M2M terminal, wherein the association request message comprises the first service identifier that corresponds to the M2M service supported by the M2M terminal, and registration request indication information; and
sending an access request message to an authentication, authorization, and accounting (AAA) server according to the registration request indication information,
wherein the access request message comprises the first service identifier and the registration request indication information such that the AAA server sends a registration request message according to the registration request indication information to the M2M server that is determined according to the first service identifier,
wherein the registration request message comprises the M2M terminal identifier, Signed and Sealed this
Third Day of January, 2017

Michelle K. Lee
*Director of the United States Patent and Trademark Office*

CERTIFICATE OF CORRECTION (continued)
U.S. Pat. No. 9,451,387 B2 wherein receiving the service information from the M2M server that supports the M2M service comprises receiving an access response message sent by the AAA server, and
wherein the access response message comprises the service information sent by the M2M server to the AAA server by using a registration response message.

Column 31, Line 18, Claim 7 should read:

A machine to machine (M2M) terminal for achieving an M2M service, comprising:
a computer processor configured to:
determine a wireless access point (AP) that supports the M2M service by determining that a first service identifier that corresponds to the M2M service supported by an M2M terminal matches a second service identifier that corresponds to the M2M service supported by the AP when the second service identifier is received from the AP in a broadcast frame;
determine the AP that supports the M2M service by determining that the first service identifier matches the second service identifier when the second service identifier is received from the AP in response to a probe request message:
establish a communication connection to the AP;
receive service configuration information sent by the AP;
send a service data report message to the AP according to the service configuration information, wherein the service data report message comprises service data corresponding to the M2M service;
    negotiate a data transmission mechanism with the AP according to the service configuration information; and
    send a service data report message to the AP according to the service configuration information and the result of the negotiation with the AP about the data transmission mechanism.

Column 32, Line 49, Column 33, Line 11, Claim 11 should read:

A wireless access point (AP) for achieving a machine to machine (M2M) service, comprising:
a computer processor configured to:
determine that the AP supports the M2M service when the AP transmits a second service identifier that corresponds to the M2M service supported by the AP to an M2M terminal as a part of a broadcast frame and the second service identifier matches a first service identifier on the M2M terminal that corresponds to the M2M service supported by the M2M terminal;
determine the AP that supports the M2M service when the AP receives a probe request message comprising the first service identifier from the M2M terminal that matches the second service identifier;
establish a communication connection to an M2M terminal that supports the M2M service;
send service configuration information to the M2M terminal;
receive a service data report message that is sent by the M2M terminal according to the service configuration information, wherein the service data report message comprises service data corresponding to the M2M service;
receive service information from an M2M server that supports the M2M service, wherein the service configuration information sent to the M2M terminal comprises the service information;

receive an association request message sent by the M2M terminal, wherein the association request

CERTIFICATE OF CORRECTION (continued)
U.S. Pat. No. 9,451,387 B2 message comprises the first service identifier that corresponds to the M2M service supported by the M2M terminal, and registration request indication information;
determine the M2M server that supports the M2M service according to the first service identifier;
send a registration request message to the M2M server according to the registration request indication information, wherein the registration request message comprises an M2M terminal identifier; and
receive a registration response message sent by the M2M server, wherein the registration response message comprises the service information.

Column 34, Line 26, Claim 13 should read:

A wireless access point (AP) for achieving a machine to machine (M2M) service, comprising:
a computer processor configured to:
determine that the AP supports the M2M service when the AP transmits a second service identifier that corresponds to the M2M service supported by the AP to an M2M terminal as a part of a broadcast frame and the second service identifier matches a first service identifier on the M2M terminal that corresponds to the M2M service supported by the M2M terminal;
determining the AP that supports the M2M service when the AP receives a probe request message comprising the first service identifier from the M2M terminal that matches the second service identifier;
establish a communication connection to an M2M terminal that supports the M2M service;
send service configuration information to the M2M terminal;
receive a service data report message that is sent by the M2M terminal according to the service configuration information, wherein the service data report message comprises service data corresponding to the M2M service;
centralize service data sent by one or more M2M terminals corresponding to the M2M service;
send the service data to the M2M server that supports the service; and
send an M2M data request message to the M2M terminal or send a broadcast frame to the M2M terminal,
wherein the M2M data request message or the broadcast frame comprises report data indication information, and
wherein the first receiving module is configured to receive the service data report message that is sent by the M2M terminal according to the service configuration information and the report data indication information.